United States Patent [19]

Tamura et al.

[11] Patent Number: 5,959,670
[45] Date of Patent: *Sep. 28, 1999

[54] IMAGE PICKUP APPARATUS WITH EXPOSURE CONTROL CORRECTION

[75] Inventors: Kyoji Tamura, Kanagawa-ken; Yuji Tsuda, Tokyo, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/827,945

[22] Filed: Apr. 16, 1997

Related U.S. Application Data

[63] Continuation of application No. 08/301,472, Sep. 7, 1994, abandoned.

[30] Foreign Application Priority Data

| Sep. 17, 1993 | [JP] | Japan | 5-231695 |
| Sep. 17, 1993 | [JP] | Japan | 5-231696 |
| Sep. 30, 1993 | [JP] | Japan | 5-268124 |

[51] Int. Cl.⁶ ......................... H04N 5/235; H04N 5/238; H04N 5/262
[52] U.S. Cl. ......................... 348/364; 348/229; 348/240; 348/365
[58] Field of Search ................. 348/222, 229, 348/230, 240, 362, 363, 364, 367, 369, 365, 358, 561, 562; H04N 5/235, 5/262, 5/238

[56] References Cited

U.S. PATENT DOCUMENTS

| 5,003,339 | 3/1991 | Kikuchi et al. | 396/100 |
| 5,019,912 | 5/1991 | Matsuda | 358/213.26 |
| 5,036,400 | 7/1991 | Haruki | 358/228 |
| 5,041,868 | 8/1991 | Suzuki | 355/68 |
| 5,083,208 | 1/1992 | Hatanaka | 358/227 |
| 5,172,234 | 12/1992 | Arita | 358/224 |
| 5,253,064 | 10/1993 | Yamamoto | 358/180 |
| 5,268,758 | 12/1993 | Nakayama et al. | 348/628 |
| 5,299,015 | 3/1994 | Imaide et al. | 348/229 |
| 5,345,264 | 9/1994 | Murata | 348/235 |
| 5,402,169 | 3/1995 | Takase | 348/208 |
| 5,428,391 | 6/1995 | Murata et al. | 348/240 |
| 5,448,293 | 9/1995 | Kogane et al. | 348/229 |
| 5,475,426 | 12/1995 | Kinugasa et al. | 348/240 |
| 5,502,484 | 3/1996 | Obada | 348/208 |
| 5,621,462 | 4/1997 | Takahashi et al. | 348/363 |

FOREIGN PATENT DOCUMENTS 0449210  10/1991  European Pat. Off. ......... H04N 3/15

OTHER PUBLICATIONS

IEEE Transactions On Consumer Electronics, vol. 37, No. 3 Aug. 1991, New York, pp. 501–505, Toshiro Kinugasa, et al., "An Electronic Zoom Video Camera Using Imager Scanning Control".

*Primary Examiner*—Wendy Garber
*Assistant Examiner*—Ngoc-Yen Vu
*Attorney, Agent, or Firm*—Robin, Blecker & Daley

[57] ABSTRACT

An image pickup apparatus includes an image pickup element for picking up an image of a subject and outputting a picked-up image signal, an electronic image magnification enlarging circuit for enlarging an image magnification of the subject by intermittently reading out the picked-up image signal outputted from the image pickup element and varying an image read-out area of an image plane, an exposure control circuit for executing exposure control on the basis of a result obtained by comparing a level of the picked-up image signal with a predetermined reference level, and a correcting circuit for correcting, according to the image magnification of the electronic image magnification enlarging circuit, a no-signal-containing portion produced by an operation of the electronic image magnification enlarging circuit and contained in the picked-up image signal to be supplied to the exposure control circuit.

25 Claims, 18 Drawing Sheets

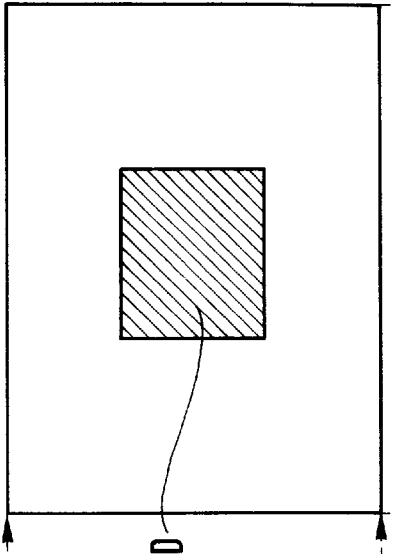
FIG. 7(b) IMAGE-PICKUP-ELEMENT OUTPUT IMAGE 72
CENTER-WEIGHTED GATE AREA
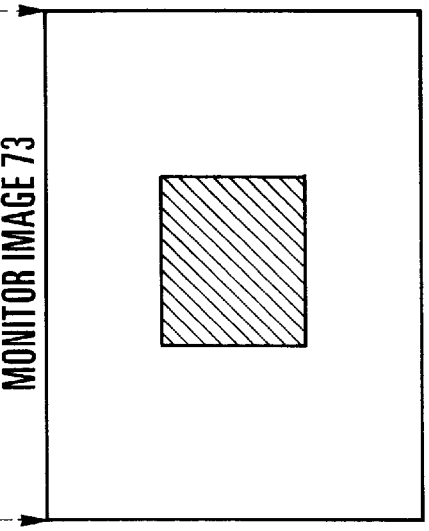
FIG. 7(c) MONITOR IMAGE 73
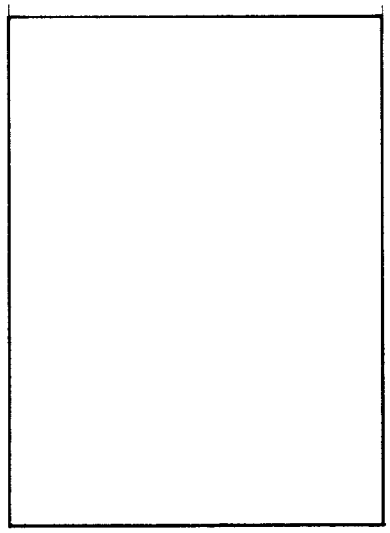
FIG. 7(a) IMAGE-PICKUP-ELEMENT LIGHT RECEIVING SURFACE 71

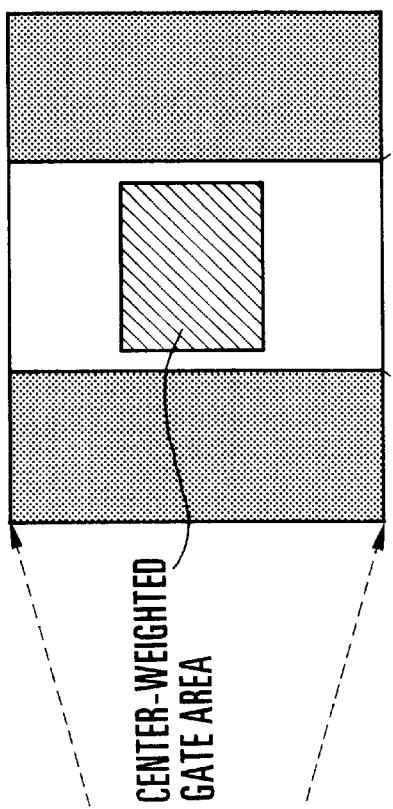
FIG. 8(b) IMAGE-PICKUP-ELEMENT OUTPUT IMAGE 82
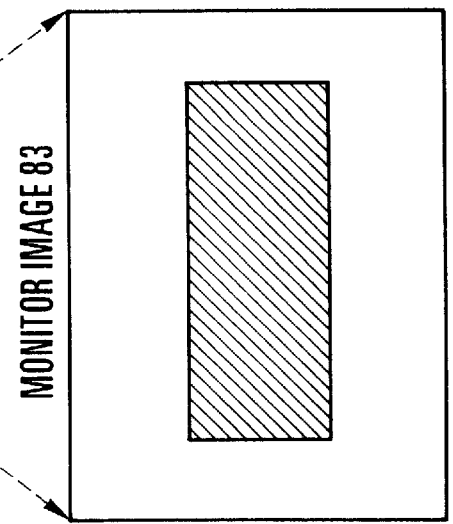
FIG. 8(c) MONITOR IMAGE 83
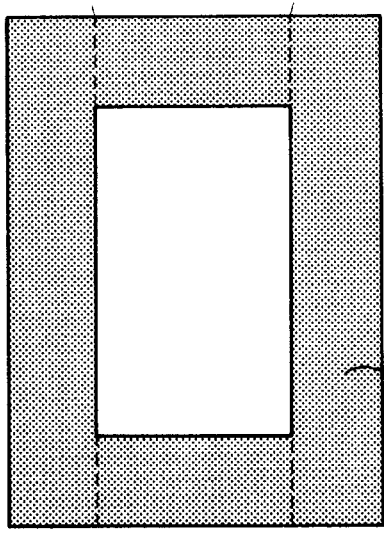
FIG. 8(a) IMAGE-PICKUP-ELEMENT LIGHT RECEIVING SURFACE 81

IMAGE-PLANE DIVISION STATE 101A (BEFORE CORRECTION OF PULSE)

IMAGE-PLANE DIVISION SIGNAL 102A (AFTER CORRECTION OF PULSE)

IMAGE-PLANE DIVISION STATE 111A (BEFORE CORRECTION OF PULSE)

IMAGE-PLANE DIVISION STATE 112A (AFTER CORRECTION OF PULSE)

FIG.15

| 1-A | 1-B | 1-C | 1-D | 1-E | 1-F | 1-G | 1-H |
|---|---|---|---|---|---|---|---|
| 2-A | 2-B | 2-C | 2-D | 2-E | 2-F | 2-G | 2-H |
| 3-A | 3-B | 3-C | 3-D | 3-E | 3-F | 3-G | 3-H |
| 4-A | 4-B | 4-C | 4-D | 4-E | 4-F | 4-G | 4-H |
| 5-A | 5-B | 5-C | 5-D | 5-E | 5-F | 5-G | 5-H |
| 6-A | 6-B | 6-C | 6-D | 6-E | 6-F | 6-G | 6-H |
| 7-A | 7-B | 7-C | 7-D | 7-E | 7-F | 7-G | 7-H |
| 8-A | 8-B | 8-C | 8-D | 8-E | 8-F | 8-G | 8-H |

FIG.17(a)

| 1-A | 1-B | 1-C | 1-D | 1-E | 1-F | 1-G | 1-H |
|---|---|---|---|---|---|---|---|
| 2-A | 2-B | 2-C | 2-D | 2-E | 2-F | 2-G | 2-H |
| 3-A | 3-B | 3-C | 3-D | 3-E | 3-F | 3-G | 3-H |
| 4-A | 4-B | 4-C | 4-D | 4-E | 4-F | 4-G | 4-H |
| 5-A | 5-B | 5-C | 5-D | 5-E | 5-F | 5-G | 5-H |
| 6-A | 6-B | 6-C | 6-D | 6-E | 6-F | 6-G | 6-H |
| 7-A | 7-B | 7-C | 7-D | 7-E | 7-F | 7-G | 7-H |
| 8-A | 8-B | 8-C | 8-D | 8-E | 8-F | 8-G | 8-H |

| 3-C | 3-D | 3-E | 3-F |
|---|---|---|---|
| 4-C | 4-D | 4-E | 4-F |
| 5-C | 5-D | 5-E | 5-F |
| 6-C | 6-D | 6-E | 6-F |

FIG.18(a)

| 1-A | 1-B | 1-C | 1-D | 1-E | 1-F | 1-G | 1-H |
|-----|-----|-----|-----|-----|-----|-----|-----|
| 2-A | 2-B | 2-C | 2-D | 2-E | 2-F | 2-G | 2-H |
| 3-A | 3-B | 3-C | 3-D | 3-E | 3-F | 3-G | 3-H |
| 4-A | 4-B | 4-C | 4-D | 4-E | 4-F | 4-G | 4-H |
| 5-A | 5-B | 5-C | 5-D | 5-E | 5-F | 5-G | 5-H |
| 6-A | 6-B | 6-C | 6-D | 6-E | 6-F | 6-G | 6-H |
| 7-A | 7-B | 7-C | 7-D | 7-E | 7-F | 7-G | 7-H |
| 8-A | 8-B | 8-C | 8-D | 8-E | 8-F | 8-G | 8-H |

FIG.18(b)

| 2-B | 2-C | 2-D | 2-E | 2-F | 2-G |
|-----|-----|-----|-----|-----|-----|
| 3-B | 3-C | 3-D | 3-E | 3-F | 3-G |
| 4-B | 4-C | 4-D | 4-E | 4-F | 4-G |
| 5-B | 5-C | 5-D | 5-E | 5-F | 5-G |
| 6-B | 6-C | 6-D | 6-E | 6-F | 6-G |
| 7-B | 7-C | 7-D | 7-E | 7-F | 7-G | though
IMAGE PICKUP APPARATUS WITH EXPOSURE CONTROL CORRECTION

This is a continuation application under 37 CFR 1.62 of prior application Ser. No. 08/301,472, filed Sep. 7, 1994, now abandoned.

BACKGROUND OF THE INVENTION

1. Field of the Invention

The present invention relates to the exposure control of an image pickup apparatus provided with electronic image magnification enlarging means for electronically enlarging the image magnification of a subject.

2. Description of the Related Art

In recent years, the evolution of video apparatus, such as video cameras, is remarkable, and various functions, such as an automatic exposure control function, an automatic focus control function and a large-magnification zoom function, are incorporated in a single video apparatus as standard functions.

In addition, recently, the function of electronically enlarging the image magnification of a subject by intermittently reading out a signal from an image pickup element and performing interpolation on the read-out signal, i.e., so-called electronic zoom, has been introduced, so that a far larger zoom magnification is realized and the functions and operability of the video apparatus are improved to a further extent.

However, an exposure control system which is generally used in a video camera or the like is arranged to control an iris so that the luminance level of a video signal outputted from an image pickup element can be kept constant at a predetermined level. In the case of a video camera provided with such an automatic exposure control function and an electronic-zoom function, no problem occurs during conventional optical zooming since an angle of view set by the zooming always coincides with a read-out area of the image pickup surface of the image pickup element. However, if the electronic-zoom function is operated, the angle of view of an optical image to be actually made incident on the image pickup surface differs from the read-out area of the image pickup element. As a result, if a picked-up image signal outputted from the image pickup element is employed on an "as is outputted" basis to enlarge an image by operating the electronic zoom, the angle of view of the enlarged image differs from the angle of view of an image area on the image pickup element which is used for exposure control (a picked-up image signal contained in an image portion which is not displayed in an image plane is also employed for exposure control). This leads to not only the problem that no optimum exposure control can be applied to the angle of view of the enlarged image, but also the problem that exposure varies or becomes unstable during electronic zooming. These problems adversely affect photography.

SUMMARY OF THE INVENTION

A first object of the present invention is to solve the above-described problems.

A second object of the present invention is to provide an image pickup apparatus capable of performing optimum exposure control even when electronic image magnification enlarging means is in operation, or whatever photographic condition a subject is placed under.

A third object of the present invention is to realize optimization of a detecting area, such as a light measuring area, under electronic angle-of-view control.

To achieve the above objects, in accordance with one aspect of the present invention, there is provided an image pickup apparatus which comprises image pickup means for picking up an image of a subject and outputting a picked-up image signal, electronic image magnification enlarging means for enlarging an image magnification of the subject by intermittently reading out the picked-up image signal outputted from the image pickup means and varying an image read-out area of an image plane, exposure control means for executing exposure control on the basis of a result obtained by comparing a level of the picked-up image signal with a predetermined reference level, and correcting means for correcting, according to the image magnification of the electronic image magnification enlarging means, a no-signal-containing portion produced by an operation of the electronic image magnification enlarging means and contained in the picked-up image signal to be supplied to the exposure control means.

With the above-described arrangement, it is possible to consistently perform exposure control according to the image magnification at which a subject image is actually displayed in an image plane. Accordingly, even if electronic zooming is executed to intermittently read out an image and perform interpolation on the image, it is possible to effect consistently correct exposure without producing an error due to a no-signal-containing portion contained in the image.

In accordance with another aspect of the present invention, there is provided an image pickup apparatus which comprises image pickup means, electronic image magnification varying means for electronically varying a read-out area of the image plane of an image signal picked up by the image pickup means, exposure control means for performing exposure control on the basis of a result obtained by comparing a level of the picked-up image signal corresponding to a predetermined area of the image plane with a predetermined reference level, and correcting means for correcting an operation of the exposure control means in accordance with a magnification set by the electronic image magnification varying means.

In accordance with another aspect of the present invention, there is provided an image input apparatus which comprises electronic angle-of-view varying means for electronically varying an angle of view of an input image, exposure control means for performing exposure control on the basis of a result obtained by comparing a level of an image signal corresponding to a predetermined area of an image plane with a predetermined reference level, and correcting means for correcting an operation of the exposure control means in accordance with the angle of view set by the electronic angle-of-view varying means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 7(a) to 7(c) are conceptual diagrams showing the state of a center-weighted gate pulse which is obtained when no electronic image magnification enlarging operation is performed;

FIGS. 8(a) to 8(c) are conceptual diagrams showing the state of a center-weighed gate pulse which is obtained when an electronic image magnification enlarging operation is performed at an image magnification of 2×;

FIG. 15 is an explanatory view of the manner in which the image pickup surface of the image pickup element is divided into a plurality of areas;

FIGS. 17(a) and 17(b) are explanatory views of the manner in which particular areas are selected from the image pickup surface when a zoom magnification is set to 2×; and FIGS. 18(a) and 18(b) are explanatory views of the manner in which particular areas are selected from the image pickup surface when the zoom magnification is set to 1.3×.

DETAILED DESCRIPTION OF THE PREFERRED EMBODIMENTS

Preferred embodiments of an image pickup apparatus according to the present invention will be described below with the accompanying drawings.

Figure 1:
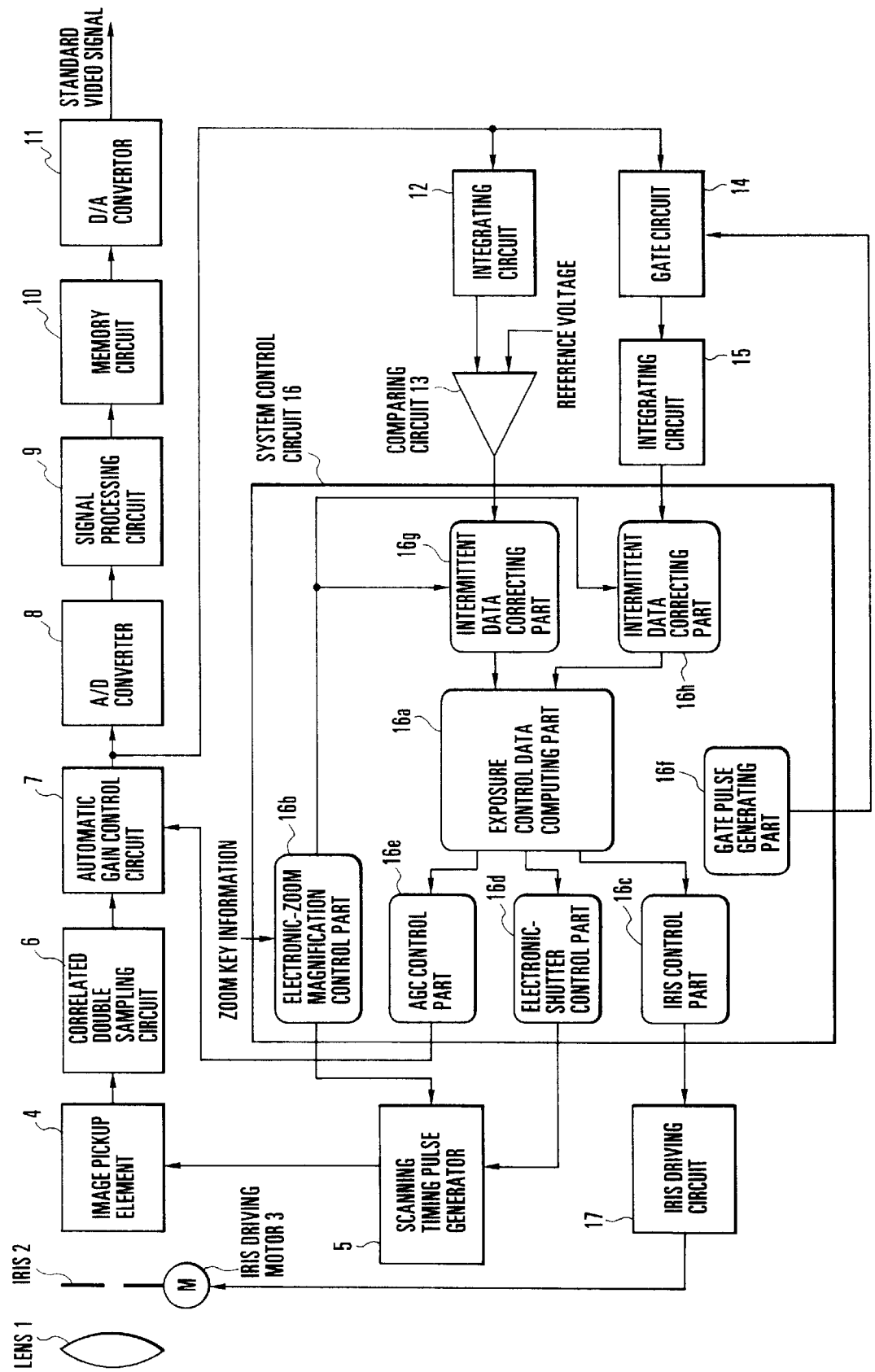
FIG. 1 is a block diagram showing a first embodiment of an image pickup apparatus according to the present invention.

A first embodiment of the present invention will be described below with reference to FIGS. 1 through 4. FIG. 1 shows one example of an exposure control system for an image pickup apparatus provided with automatic exposure control means and an electronic zoom which constitutes electronic image magnification enlarging means according to the first embodiment of the present invention. For the convenience of explanation, the electronic zoom is assumed to have an electronic-zoom magnification of 2×.

FIG. 1 is a block diagram of the first embodiment of the present invention, and schematically shows the construction of a video camera provided with the automatic exposure control means and the electronic zoom which constitutes the electronic image magnification enlarging means. The video camera shown in FIG. 1 includes a focusing lens 1, an iris mechanism (hereinafter referred to as the iris) 2 for adjusting the amount of light to be made incident on an image pickup element 4, an iris driving motor 3 for driving the iris 2, the image pickup element 4 such as a CCD, a scanning timing pulse generator 5 for driving the image pickup element 4, a correlated double sampling circuit 6, an automatic gain control circuit (hereinafter referred to as the AGC circuit) 7 for controlling the output signal level of the image pickup element 4 together with the iris 2 so that the output signal level can be kept constant, an A/D converter 8 for converting an analog image signal into a digital image signal, a signal processing circuit 9 for applying predetermined signal processings, such as gamma correction, knee correction and white peak clipping, to the digital image signal outputted from the A/D converter 8, an image memory circuit 10, and a D/A converter 11 for converting the digital image signal read out from the image memory circuit 10 into an analog image signal.

The video camera shown in FIG. 1 includes an integrating circuit 12 for integrating the image signal outputted from the AGC circuit 7 for a predetermined period of time and smoothing the image signal, and a comparing circuit 13 for comparing the integral output of the integrating circuit 12 with a predetermined reference voltage and generating an output according to the comparison result.

The image signal smoothed by the integrating circuit 12 is compared with the predetermined reference voltage by the comparing circuit 13, and an error signal according to the resultant error is supplied to a system control circuit 16 which will be described later. The system control circuit 16 computes the amount of exposure correction and selects, according to the status of a subject, one or a plurality of optimum control parameters from among exposure control parameters for the iris 2, an electronic shutter for adjusting the photoelectric conversion time of the image pickup element 4, the AGC circuit 7 and others, and converts the selected exposure parameter or parameters into exposure control data on the basis of the computed amount of exposure correction. The system control circuit 16 outputs the respective exposure control data to an iris driving circuit 17 for driving the iris driving motor 3, and the scanning timing pulse generator 5, to execute exposure control so that the integral output of the integrating circuit 12 can be made equal to the predetermined reference voltage, i.e., so that, finally, the level of the output image signal of the D/A converter 11 can be kept constant.

Figure 4:
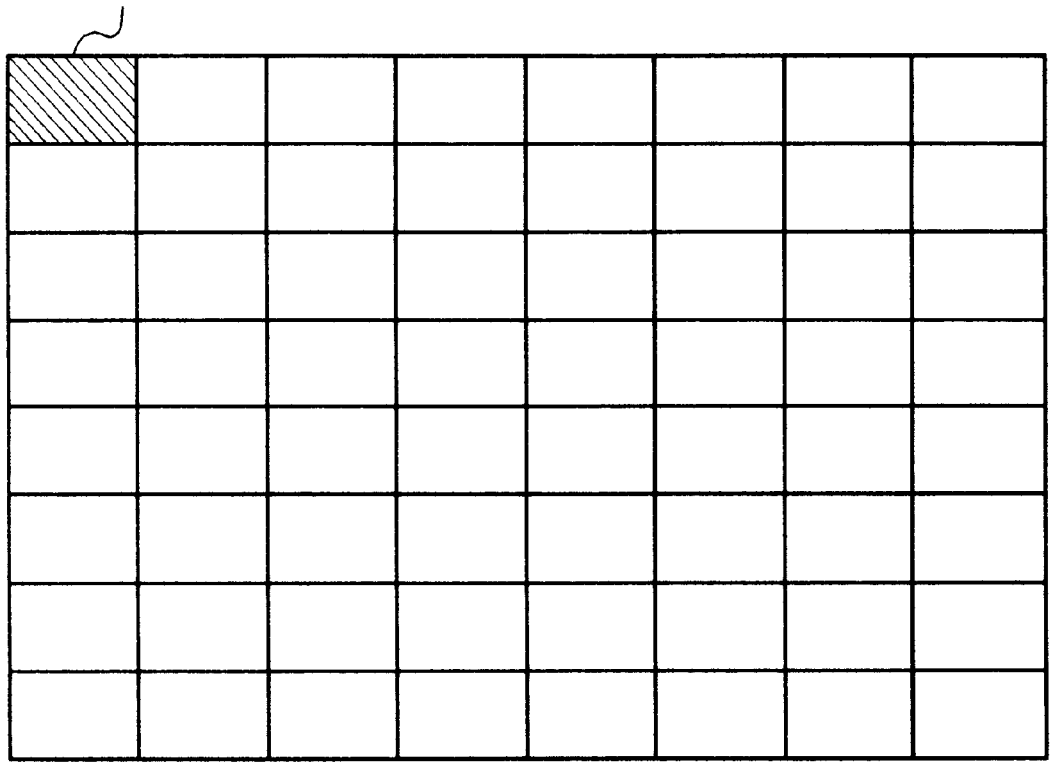
FIG. 4 is a conceptual diagram showing one example of division of an image plane.

The image signal outputted from the AGC circuit 7, which is not subjected to the processing required for electronic image magnification enlargement, such as interpolation, is also supplied to a gate circuit 14. In the gate circuit 14, the image signal is gated by a gate signal for dividing the image signal into image areas as shown in FIG. 4 (FIG. 4 shows one example in which an image plane is divided into sixty-four equal parts) for the purpose of obtaining detailed luminance information about the image plane. The output of the gate circuit 14 is smoothed by an integrating circuit 15 and then detected by the system control circuit 16. The system control circuit 16 can provide various light measurement patterns by imparting weight to data detected from each of the image areas divided by the gate signal. For example, the system control circuit 16 can provide the peak light measurement control of detecting a signal indicative of a high luminance portion of the image plane on the basis of the detected signal and causing the iris 2, the electronic shutter, the AGC circuit 7 or the like to operate so that the amount of exposure of the high-luminance signal can be kept at an optimum exposure level. In addition, the combinations of such light measurement patterns and the exposure parameters for the iris, the electronic shutter, the AGC circuit and the like are programmed, whereby it is possible to implement so-called program AE for executing effective exposure control by switching the combinations according to individual photographic statuses.

The system control circuit 16 is formed by a microcomputer and controls the entire system. The exposure control system of the system control circuit 16 includes an exposure control data computing part 16a for computing, on the basis of the outputs of the comparing circuit 13 and the integrating circuit 15, the exposure control data required to appropriately control the iris 2, the electronic shutter (for control of the accumulation time of the image pickup element 4) and the AGC circuit 7 for the purpose of exposure control, an iris control part 16c for controlling the iris driving circuit 17 in accordance with the output of the exposure control data computing part 16a, an electronic-shutter control part 16d for controlling the scanning timing pulse generator 5 in accordance with the output of the exposure control data computing part 16a to control the accumulation time of the image pickup element 4, i.e., the shutter speed of the electronic shutter, and an AGC control part 16e for controlling the gain of the AGC circuit 7 in accordance with the output of the exposure control data computing part 16a (so as to increase the gain level of the AGC circuit 7 under the low-illuminance condition that no correct exposure can be attained even if the iris 2 is made fully open).

The system control circuit 16 also includes an electronic-zoom magnification control part 16b for varying a read-out area of the image plane by controlling the scanning timing pulse generator 5 in accordance with the external manipulation of a zoom key (not shown) and effecting intermittent reading from the image pickup element 4.

The system control circuit 16 also includes a gate pulse generating part 16f for generating a gate pulse for controlling the gate circuit 14 to divide the image plane as shown in FIG. 4 and detect a signal indicative of a high-luminance portion of the image plane and the like.

Image magnification information set by the electronic-zoom magnification control part 16b is supplied to the gate pulse generating part 16f, and the gate pulse generating part 16f executes, on the basis of the image magnification information, the operation of correcting a light measuring area according to the image magnification, i.e., a read-out area of the image plane of the image pickup element 4.

The system control circuit 16 also includes intermittent data correcting parts 16g and 16h for correcting the respective output data of the comparing circuit 13 and the integrating circuit 15 in accordance with the image magnification set by the electronic-zoom magnification control part 16b and correcting an exposure control error resulting from the simultaneous presence of a portion which contains image information and a portion which contains no image information.

Figure 2A:
FIGS. 2(a) to 2(d) are timing charts showing the scanning timing of an image pickup element.
Figure 2B:
Figure 2C:
Figure 2D:

The operation of the electronic zoom will be described below with reference to FIGS. 2(a) to 2(d). FIGS. 2(a) to 2(d) are timing charts showing the scanning timing of the image pickup element 4. FIG. 2(a) shows a vertical transfer pulse, FIG. 2(b) shows a horizontal transfer pulse, FIG. 2(c) shows a horizontal scanning pulse, and FIG. 2(d) shows the output signal of the image pickup element 4. The vertical transfer pulse (FIG. 2(a)) and the horizontal transfer pulse (FIG. 2(b)) are generated by the scanning timing pulse generator 5.

Figure 3:
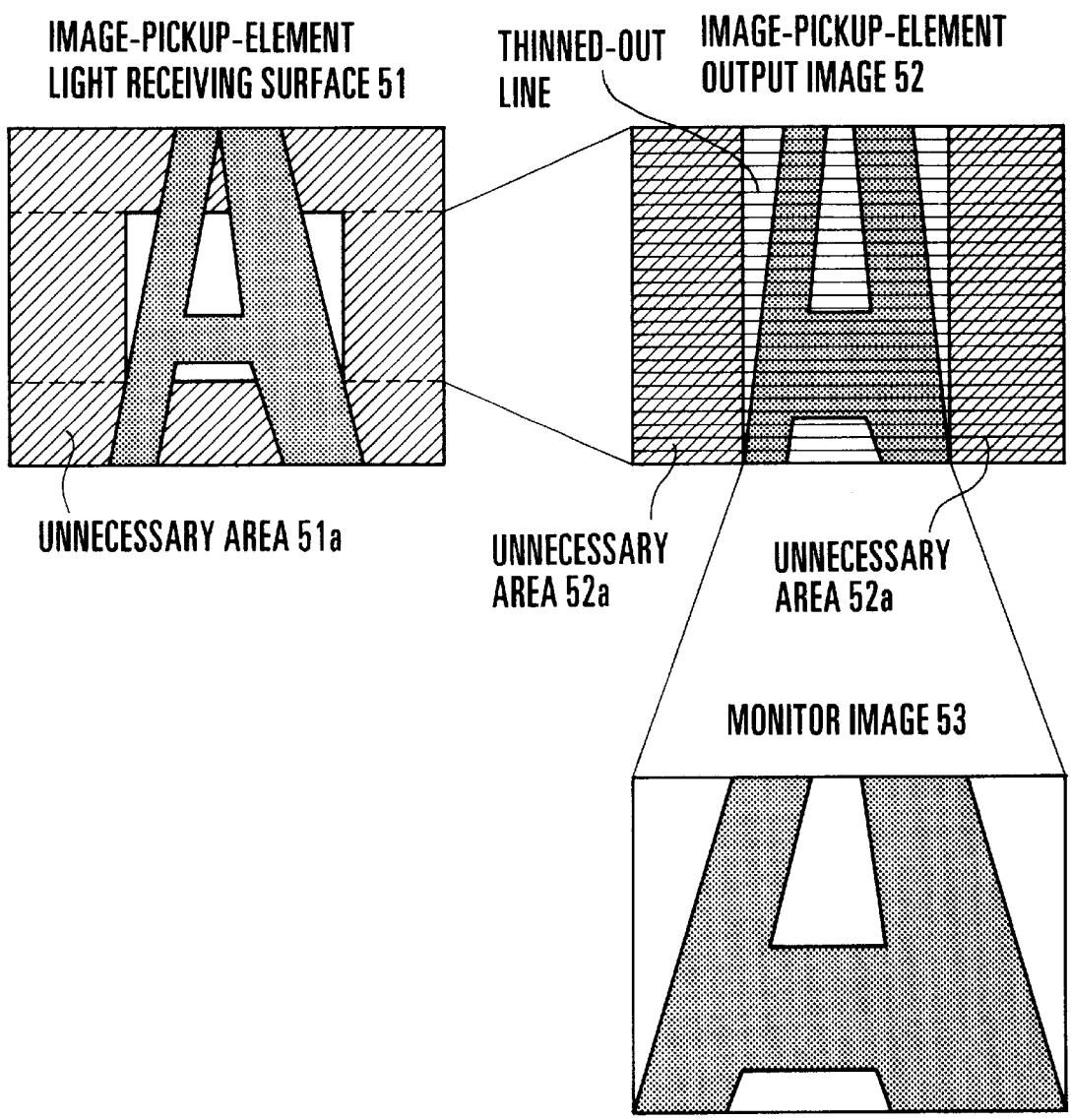
FIG. 3 is a conceptual diagram showing an image of a subject.

FIG. 3 is a conceptual diagram showing an image of a subject, and shows the states of an image-pickup-element light receiving surface 51, an image-pickup-element output image 52 and a monitor image 53 displayed on a monitor screen. In FIG. 3, the area of the image-pickup-element light receiving surface 51 which is to be enlarged is surrounded by a frame, and the unnecessary area other than the area to be enlarged is shown by hatching.

In the case of the electronic zoom of 2×, to scan only the area of the image-pickup-element light receiving surface 51 which is to be enlarged, the transfer speed of the vertical transfer pulse of FIG. 2(a) for driving a vertical CCD register (not shown) provided in the image pickup element 4 is made fast during only a vertical blanking period, thereby sweeping out the unnecessary charge accumulated in the upper and lower hatched areas of the image-pickup-element light receiving surface 51. Regarding the area to be enlarged, one vertical transfer pulse of FIG. 2(a) is generated for every other horizontal transfer pulse of FIG. 2(c), thereby reading out the image-pickup-element output signal of FIG. 2(d). At this time, in order that signals accumulated in the horizontal scanning direction can be read out vertically intermittently according to an enlargement magnification, the image-pickup-element output signal of FIG. 2(d) is read out while being thinned out at the ratio of one to two scanning lines in accordance with a control signal supplied from the scanning timing pulse generator 5. Thus, the image-pickup-element output image 52 is prepared.

The read-out image-pickup-element output signal is inputted to the correlated double sampling circuit 6, in which noise components are eliminated. The output of the correlated double sampling circuit 6 is amplitude-limited by the AGC circuit 7 and then supplied to the A/D converter 8, in which the analog signal outputted from the AGC circuit 7 is converted into a digital signal. The digital signal outputted from the A/D converter 8 is supplied to the signal processing circuit 9, in which the digital signal is subjected to chrominance signal processing. The signal outputted from the signal processing circuit 9 is supplied to and stored in the image memory circuit 10. The system control circuit 16 calculates the average values of adjacent scanning lines of the signal stored in the image memory circuit 10, and performs vertical interpolations by interpolating the respective average values between the adjacent scanning lines. Image signals corresponding to right and left unnecessary areas 52a of the image-pickup-element output image 52 are discarded in the image memory circuit 10 by inhibiting reading or writing of digital data indicative of the image signals, and the system control circuit 16 performs horizontal interpolations by finding the average values of digital data indicative of adjacent pixels of an image signal which corresponds to an effective area to be enlarged and interpolating the average values between the digital data indicative of the adjacent pixels. The digital signal interpolated in this manner is inputted to the D/A converter 11, in which the interpolated digital signal is converted into an analog image signal. Thus, the image shown as the monitor image 53 is obtained.

Exposure control to be executed during electronic zooming, which constitutes one feature of the first embodiment, will be described below.

As is apparent from the above description, the exposure control according to the first embodiment is arranged to control the iris 2, the AGC circuit 7, the accumulation time of the image pickup element 4, and the like so that a video signal level can be kept constant. However, if the area of the image plane which is to be subjected to exposure control is made coincident with an angle of view which is electronically varied in the above-described manner and exposure control is executed by using a signal subjected to enlargement processing and interpolation processing, the following problem occurs.

If a final angle of view provided by electronic zooming differs from an area to be subjected to light measurement, the amount of exposure of an electronically zoomed image may not reach an optimum exposure level. If an image signal indicative of an electronically zoomed image, i.e., the output of the D/A converter 11, is supplied to the integrating circuit 12 and the gate circuit 14 on an "as is outputted" basis in order to make the final angle of view provided by the electronic zooming coincident with the angle of view to be subjected to light measurement, a signal near a high-luminance portion of an image signal which has been subjected to enlargement and interpolation processing during an electronic-zooming operation in the above-described manner is compressed and clipped because of the insufficient dynamic range of an A/D converter, a D/A converter, a signal processing circuit or the like or by the influence of gamma correction, knee correction or white peak clipping in the signal processing circuit. This makes it impossible to faithfully obtain information, so that it becomes impossible to correctly control the exposure level of a high-luminance subject or a high-contrast subject during photography.

To solve the above-described problem, according to the first embodiment, the output signal of the image pickup element which is not yet subjected to the aforesaid signal processing, such as gamma correction, is employed for exposure control so that even if a non-interpolated, no-signal-containing line occurs in an image which is intermittently read out during an electronic image magnification enlarging operation, it is possible to correct the influence of such a no-signal-containing line upon the exposure control. In addition, since a signal which is not yet subjected to the signal processing, such as gamma correction, and has a sufficient dynamic range is employed as a signal in which to detect an image for exposure control, it is possible to achieve correct exposure control even in the case of a high-luminance subject, whereby it is possible to achieve optimum exposure control similar to that achievable in a normal photographic operation.

Specifically, referring to FIG. 1, the output signal of the AGC circuit 7 is employed. This AGC output signal is supplied to the comparing circuit 13 via the integrating circuit 12 as well as to the integrating circuit 15 via the gate circuit 14. The output signals of the comparing circuit 13 and the integrating circuit 15 are supplied to the system control circuit 16. The system control circuit 16 is arranged to execute normal exposure control processing if no electronic image magnification enlarging operation is performed. However, since the output signal of the AGC circuit 7 is a signal which is not yet subjected to the signal processing, such as gamma correction or knee correction, and has a sufficient dynamic range, it is possible to provide accurate luminance information even in the case of a high-luminance subject. Accordingly, although the system control circuit 16 executes exposure control similar to the conventional one, it is possible to achieve correct exposure control even in the case of a high-luminance subject or a high-contrast subject.

Although it is possible to achieve correct exposure control by employing a signal, which is horizontally thinned out and is not subjected to interpolation, as a video signal for exposure control in the above-described manner, it is still difficult to realize accurate exposure control with such a method alone.

For this reason, the system control circuit 16 is arranged to execute the following processing operation during the electronic image magnification enlarging operation.

Since the output signal of the AGC circuit 7 during the electronic image magnification enlarging operation is horizontally thinned out and is not subjected to interpolation, no-signal-containing lines are present in the output signal. For example, if a 2× enlargement operation is executed as described above, reading from the image pickup element 4 is performed at the ratio of one to two scanning lines, and half of the read-out lines contain no signals. The attenuation ratio of the signal outputted from the comparing circuit 13 in this case is ½ times that of a signal outputted from the comparing circuit 13 when a subject of equal brightness is photographed without executing the electronic image magnification enlarging operation.

Similarly, if the image magnification of the electronic image magnification enlarging operation is n times, the attenuation ratio is 1/n times, which means that the attenuation ratio varies with the image magnification. Accordingly, the intermittent data correcting part 16g provided in the system control circuit 16 corrects the amount of attenuation of a detected signal due to no-signal-containing lines, according to the image magnification on the basis of image magnification information supplied from the electronic-zoom magnification control part 16b. On the basis of the data corrected by the intermittent data correcting part 16g, the exposure control data computing part 16a computes the amount of correction so that the output of the D/A converter 11 can always be kept constant at a correct level.

Then, the exposure control data computing part 16a selects optimum exposure control parameters, and the amount of correction is converted into control data according to the respective control parameters by the corresponding ones selected from among the iris control part 16c, the electronic-shutter control part 16d and the AGC control part 16e. The control data are outputted to the respective ones of the iris driving circuit 17, the scanning timing pulse generator 5 and the AGC circuit 7, whereby an optimum exposure control operation is performed.

Similarly, the output signal of the integrating circuit 15 in which the image plane is divided into equal parts also varies according to the image magnification of the electronic image magnification enlarging operation. Accordingly, the amount of attenuation due to the no-signal-containing lines is corrected by the intermittent data correcting part 16h. The output of the intermittent data correcting part 16h is employed as a program AE control signal in the exposure control data computing part 16a, whereby an effective exposure control operation is performed.

As described previously, if an electronic image magnification enlarging operation is executed at the aforesaid image magnification of 2×, the signal accumulated in the image pickup element 4 is read out in the state of being thinned out every other scanning line, and no-signal-containing lines and signal-containing lines are uniformly present in the read-out image signal. If the image magnification is lower than 2×, no-signal-containing lines occur at the ratio of, for example, one to some tens of scanning lines, whereas if the image magnification is higher than 2×, the number of signal-containing lines is less than the number of no-signal-containing lines. In the case of such an awkward image magnification, the number of no-signal-containing lines varies among different gate positions, so that even if a subject of uniform brightness is photographed, different data will be contained in image-plane division signals obtained from individual gate areas.

Accordingly, the amounts of attenuation differ for different image magnifications and different gate positions, and the required amounts of correction also differ at the respective gate positions. For this reason, the intermittent data correcting part 16h finds the amounts of correction needed at the respective gate positions on the basis of the individual gate positions and the image magnification employed, and corrects the data outputted from the integrating circuit 15, thereby enabling an accurate exposure control operation.

Figure 5:
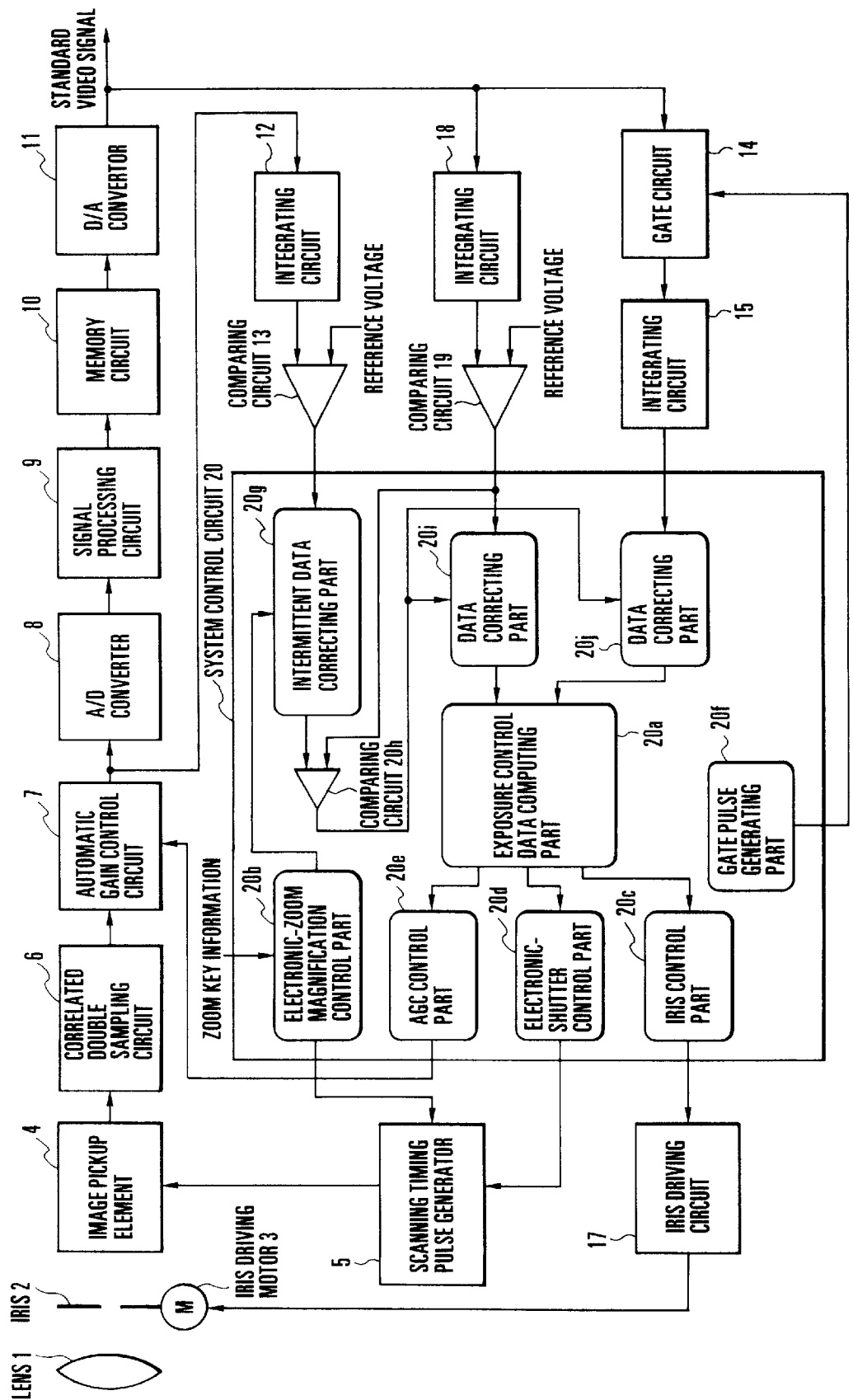
FIG. 5 is a block diagram showing a second embodiment of the image pickup apparatus according to the present invention.

A second embodiment of the present invention will be described below. FIG. 5 is a block diagram showing one example of an image pickup apparatus provided with an electronic image magnification enlarging means according to the second embodiment of the present invention. In the shown example, the circuit constructions and the operations of the focusing lens 1 to the integrating circuit 15 and the iris driving circuit 17 are similar to those described above in connection with the first embodiment of FIG. 1. A system control circuit 20 which has internal processing different from that of the system control circuit 16 is substituted for the system control circuit 16, and an integrating circuit 18 and a comparing circuit 19 are added.

In the case of the arrangement according to the first embodiment in which a signal obtained by correcting the influence of no-signal-containing lines upon the output signal of the image pickup element 4 caused by the electronic image magnification enlarging operation is directly employed for exposure control, the signal outputted from the image pickup element 4 during the electronic image magnification enlarging operation contains a signal indicated at the unnecessary areas 52a of the image-pickup-element output image 52. As a result, the exposure control is influenced by the brightness of a subject which is not displayed as the monitor image 53 outputted as a standard video signal, so that optimum exposure may not be performed on the monitor image 53.

To solve this problem, in accordance with the second embodiment of the present invention, the output signal of the D/A converter 11 is supplied to the comparing circuit 19 via the integrating circuit 18 similarly to the case of the conventional art, and the supplied signal is subjected to smoothing and comparing processing in a manner similar to that used in the integrating circuit 12 and the comparing circuit 13 and is then supplied to the system control circuit 20. Also, the output signal of the AGC circuit 7 which is not yet subjected to signal processing, such as gamma correction, and has a sufficient dynamic range is subjected to smoothing and comparing processing in the integrating circuit 12 and the comparing circuit 13 in the above-described manner, and is then supplied to the system control circuit 20.

In the system control circuit 20, an intermittent data correcting part 20g corrects the amount of attenuation of the output signal of the comparing circuit 13 due to the influence of no-signal-containing lines occurring during an electronic image magnification enlarging operation, in accordance with the image magnification set by an electronic-zoom magnification control part 20b. A comparing part 20h compares the output signal of the intermittent data correcting part 20g with the output signal of the comparing circuit 19 which is an interpolated signal supplied from the D/A converter 11.

If a high-luminance subject or a high-contrast subject is photographed, a signal indicative of the high-luminance portion of the output signal of the comparing circuit 19 to which the output of the D/A converter 11 is inputted is compressed and clipped, whereas the output signal of the comparing circuit 13 to which the output of the AGC circuit 7 is inputted before signal processing, such as gamma correction, has a sufficient dynamic range and an accurate signal indicative of the high-luminance portion of the output signal. Accordingly, the comparing part 20h can perform high-luminance detection by comparing the output signal of the comparing circuit 19 with the output signal of the comparing circuit 13. A data correcting part 20i and a data correcting part 20j respectively weight the output signal of the comparing circuit 19 and the output signal of the integrating circuit 15 which is an image-plane division signal, on the basis of the data obtained in the comparing part 20h, i.e., the high-luminance detection information, thereby compensating for data indicative of the high-luminance signal portion compressed and clipped in the signal processing circuit 9.

On the basis of the data outputted from the data correcting part 20i and the data correcting part 20j, an exposure control data computing part 20a finds optimum exposure data and outputs the data to the respective control parts. Accordingly, even if an electronic image magnification enlarging operation is performed, it is possible to always execute an optimum exposure control operation irrespective of the image magnification employed and the status of a subject.

As is apparent from the above description, in accordance with the above-described embodiment, the influence of a no-signal-containing portion upon a picked-up image signal due to intermittent reading from the image pickup element is eliminated from the picked-up image signal which is not yet subjected to signal processing, such as gamma correction, and has a sufficient dynamic range capable of providing accurate information on a high-luminance signal portion, as well as which is intermittently read out from the image pickup element by the electronic image magnification enlarging operation and is not yet subjected to interpolation. The thus-corrected signal is employed as a video detection signal for exposure control. Accordingly, even if the electronic image magnification enlarging operation is executed, it is possible to perform a consistently stable, optimum exposure control operation on various subjects similarly to the case where no electronic image magnification enlarging operation is performed.

A third embodiment of the present invention will be described below. The third embodiment is intended to realize consistently correct exposure control in the aforesaid image pickup apparatus provided with electronic image magnification varying means and arranged to execute exposure control on the basis of the level of a picked-up image signal.

As is known, if electronic zooming is performed, a discrepancy occurs between the angle of view of a picked-up image and the angle of view of an actually read-out image, and a light measuring area also varies correspondingly.

The discrepancy is a great problem when correct exposure control is to be performed. The simplest method of solving only the problem of the discrepancy between the angles of view is to execute exposure control using a picked-up image signal subjected to electronic zooming. However, a signal near a high-luminance portion of an image signal which has been subjected to enlargement and interpolation processing during an electronic-zooming operation is compressed and clipped because of the insufficient dynamic range of an A/D converter, a D/A converter, a signal processing circuit or the like or by the influence of gamma correction, knee correction or white peak clipping in the signal processing circuit. This makes it impossible to faithfully obtain information, so that it becomes impossible to correctly control the exposure level of a high-luminance subject or a high-contrast subject during photography.

An object of the third embodiment is to provide an image pickup apparatus provided with electronic image magnification enlarging means and capable of executing optimum exposure control whatever photographic condition a subject is placed under. The image pickup apparatus comprises image pickup means for picking up an image of a subject and outputting a picked-up image signal, electronic image magnification enlarging means for electrically processing the picked-up image signal outputted from the image pickup means and enlarging an image magnification of the subject, and exposure control means for executing exposure control on the basis of a level of the picked-up image signal which is outputted from the image pickup means and is not yet subjected to processing by the electronic image magnification enlarging means.

In accordance with the third embodiment, there is also provided an image pickup apparatus which comprises image storing means for storing an image signal, electronic image magnification enlarging means for enlarging an image magnification by intermittently reading out the image signal from the image storing means in accordance with a transfer rate corresponding to the image magnification, generating an interpolation signal from the read-out image signal and interpolating the interpolation signal into the image signal, exposure control means for executing, when the electronic image magnification enlarging means is in operation, exposure control on the basis of the image signal which is intermittently read out from the image storing means and is not yet subjected to interpolation processing, and correcting means for correcting an influence exerted upon the exposure control means by a no-signal-containing portion of the image signal which varies according to the image magnification of the electronic image magnification enlarging means and which is not subjected to the interpolation processing.

With the above-described arrangement, it is possible to execute correct exposure control even in the case of a high-luminance subject by using as a video detection signal for exposure control a signal which is not yet subjected to signal processing, such as gamma correction, and has a sufficient dynamic range. Accordingly, even if an electronic image magnification enlarging operation is performed, it is possible to achieve optimum exposure control similar to that achievable in a normal photographic operation.

In addition, even if a non-interpolated, no-signal-containing line occurs in an image which is intermittently read out during an electronic image magnification enlarging operation, it is possible to correct the influence of such a no-signal-containing line upon exposure control. Accordingly, it is possible to achieve-optimum exposure control similar to that achievable in the normal photographic operation.

An image pickup apparatus according to the third embodiment of the present invention will be described below in detail with reference to FIG. 6 through FIGS. 11(*a*) and 11(*b*).

Figure 6:
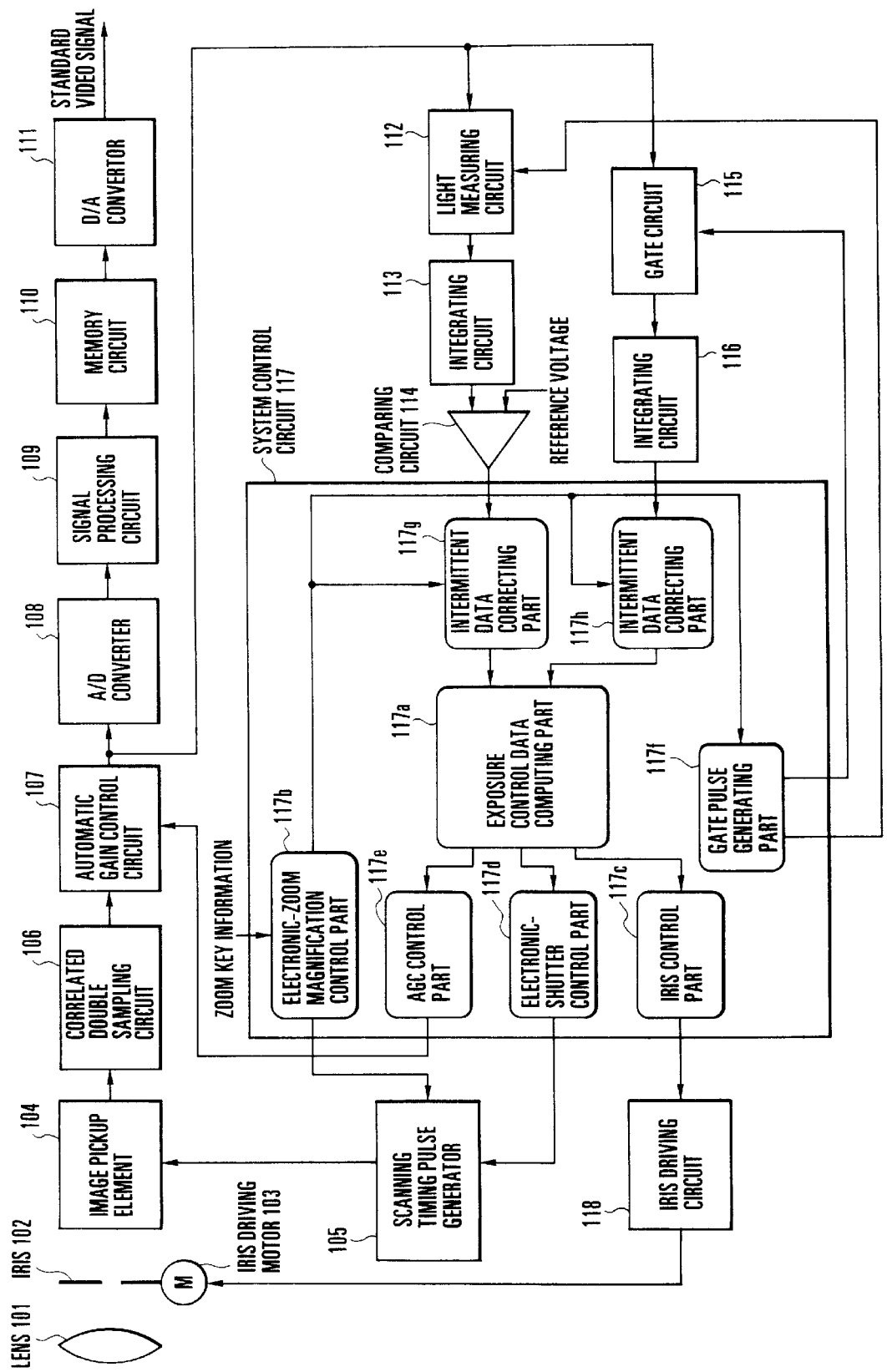
FIG. 6 is a block diagram showing a third embodiment of the image pickup apparatus according to the present invention.

The arrangement of the third embodiment will be described below with reference to FIG. 6. FIG. 6 shows one example of an exposure control system for the image pickup apparatus provided with automatic exposure control means and an electronic zoom which constitutes electronic image magnification enlarging means according to the third embodiment of the present invention. For the convenience of explanation, the electronic zoom is assumed to have an electronic-zoom magnification of 2×.

FIG. 6 is a block diagram of the third embodiment of the present invention, and schematically shows the construction of a video camera provided with the automatic exposure control means and the electronic zoom which constitutes the electronic image magnification enlarging means. The video camera shown in FIG. 6 includes a focusing lens 101, an iris mechanism (hereinafter referred to as the iris) 102 for adjusting the amount of light to be made incident on an image pickup element 104, an iris driving motor 103 for driving the iris 102, the image pickup element 104 such as a CCD, a scanning timing pulse generator 105 for driving the image pickup element 104, a correlated double sampling circuit 106, an automatic gain control circuit (hereinafter referred to as the AGC circuit) 107 for controlling the output signal level of the image pickup element 104 together with the iris 102 so that the output signal level can be kept constant, an A/D converter 108 for converting an analog image signal into a digital image signal, a signal processing circuit 109 for applying predetermined signal processings, such as gamma correction, knee correction and white peak clipping, to the digital image signal outputted from the A/D converter 108, an image memory circuit 110, and a D/A converter 111 for converting the digital image signal read out from the image memory circuit 110 into an analog image signal.

The video camera shown in FIG. 6 includes a light measuring circuit 112 for imparting optimum weight to each light measuring area provided in an image plane, on the basis of gate pulses outputted from a system control circuit 117, an integrating circuit 113 for integrating the image signal outputted from the light measuring circuit 112 for a predetermined period of time and smoothing the image signal, and a comparing circuit 114 for comparing the integral output of the integrating circuit 113 with a predetermined reference voltage and generating an output according to the comparison result.

Specifically, the light measuring circuit 112 divides the image plane into a plurality of areas on the basis of gate pulses outputted from the system control circuit 117 which will be described later, and imparts optimum weight to each of the areas, thereby realizing various light measurement patterns and modes, such as average light measurement in which uniform weight is imparted to the entire image plane to optimize the average exposure level of the entire image plane, center-weighted light measurement in which the exposure level of the central portion of the image plane is optimized, center-weighted average light measurement in which greater weight is imparted to the central portion of the image plane and smaller weight is imparted to the peripheral portion, and spot light measurement in which light measurement is performed on only a small area provided in the central portion of the image plane. The light measuring circuit 112 selectively combines these modes and executes control so that optimum exposure control can be applied to various subjects.

When the light measuring circuit 112 performs light measurement on an image signal on the basis of a predetermined light measurement pattern, the image signal outputted from the light measuring circuit 112 is smoothed by the integrating circuit 113. The smoothed image signal is compared with the predetermined reference voltage by the comparing circuit 114, and an error signal according to the resultant error is supplied to the system control circuit 117 which will be described later. The system control circuit 117 computes the amount of exposure correction and selects, according to the status of a subject, one or a plurality of optimum control parameters from among exposure control parameters for the iris 102, an electronic shutter for adjusting the photoelectric conversion time of the image pickup element 104, the AGC circuit 107 and others, and converts the selected exposure parameter or parameters into exposure control data on the basis of the computed amount of exposure correction. The system control circuit 117 outputs the respective exposure control data to an iris driving circuit 118 for driving the iris driving motor 103, and the scanning timing pulse generator 105, to execute exposure control so that the integral output of the integrating circuit 113 can be made equal to the predetermined reference voltage, i.e., so that, finally, the level of the output image signal of the D/A converter 111 can be kept constant.

The image signal outputted from the AGC circuit 107, which is not subjected to the processing required for electronic image magnification enlargement, such as interpolation, is also supplied to a gate circuit 115. In the gate circuit 115, the image signal is gated by a gate signal for dividing the image signal into image areas as shown in FIG. 4 (FIG. 4 shows one example in which an image plane is divided into sixty-four equal parts) for the purpose of obtaining detailed luminance information about the image plane. The output of the gate circuit 115 is smoothed by an integrating circuit 116 and then detected by the system control circuit 117. The system control circuit 117 can provide various light measurement patterns by imparting weight to data detected from each of the image areas divided by the gate signal. For example, the system control circuit 117 can provide the peak light measurement control of detecting a signal indicative of a high luminance portion of the image plane on the basis of the detected signal and causing the iris 102, the electronic shutter, the AGC circuit 107 or the like to operate so that the amount of exposure of the high-luminance signal can be kept at an optimum exposure level. In addition, the combinations of such light measurement patterns and the exposure parameters for the iris, the electronic shutter, the AGC circuit and the like are programmed, whereby it is possible to implement so-called program AE for executing effective exposure control by switching the combinations according to individual photographic statuses.

The system control circuit 117 is formed by a microcomputer and controls the entire system. The exposure control system of the system control circuit 117 includes an exposure control data computing part 117a for computing, on the basis of the outputs of the comparing circuit 114 and the integrating circuit 116, the exposure control data required to appropriately control the iris 102, the electronic shutter (for control of the accumulation time of the image pickup element 104) and the AGC circuit 107 for the purpose of exposure control, an iris control part 117c for controlling the iris driving circuit 118 in accordance with the output of the exposure control data computing part 117a, an electronic-shutter control part 117d for controlling the scanning timing pulse generator 105 in accordance with the output of the exposure control data computing part 117a to control the accumulation time of the image pickup element 104, i.e., the shutter speed of the electronic shutter, and an AGC control part 117e for controlling the gain of the AGC circuit 107 in accordance with the output of the exposure control data computing part 117a (so as to increase the gain level of the AGC circuit 107 under the low-illuminance condition that no correct exposure can be attained even if the iris 102 is made fully open).

The system control circuit 117 also includes an electronic-zoom magnification control part 117b for varying a read-out area of the image plane by controlling the scanning timing pulse generator 105 in accordance with the external manipulation of a zoom key (not shown) and effecting intermittent reading from the image pickup element 104.

The system control circuit 117 also includes a gate pulse generating part 117f for generating gate pulses for controlling the gate circuit 115 to divide the image plane as shown in FIG. 4 and detect a signal indicative of a high-luminance portion of the image plane and the like.

Image magnification information set by the electronic-zoom magnification control part 117b is supplied to the gate pulse generating part 117f, and the gate pulse generating part 117f executes, on the basis of the image magnification information, the operation of correcting a light measuring area according to the image magnification, i.e., a read-out area of the image plane of the image pickup element 104.

The system control circuit 117 also includes intermittent data correcting parts 117g and 117h for correcting the respective output data of the comparing circuit 114 and the integrating circuit 116 in accordance with the image magnification set by the electronic-zoom magnification control part 117b and correcting an exposure control error resulting from the simultaneous presence of a portion which contains image information and a portion which contains no image information.

Although described previously in connection with the first embodiment, the operation of the electronic zoom according to the third embodiment will be described below with reference to FIGS. 2(a) to 2(d). FIGS. 2(a) to 2(d) are timing charts showing the scanning timing of the image pickup element 104. FIG. 2(a) shows a vertical transfer pulse, FIG. 2(b) shows a horizontal transfer pulse, FIG. 2(c) shows a horizontal scanning pulse, and FIG. 2(d) shows the output signal of the image pickup element 104. The vertical transfer pulse and the horizontal transfer pulse are generated by the scanning timing pulse generator 105.

The manner in which an image of a subject is varied during electronic zooming is similar to that described previously with reference to FIG. 3 in connection with the first embodiment.

FIG. 3 is a conceptual diagram showing an image of a subject, and shows the states of the image-pickup-element light receiving surface 51, the image-pickup-element output image 52 and the monitor image 53 displayed on a monitor screen. In FIG. 3, the area of the image-pickup-element light receiving surface 51 which is to be enlarged is surrounded by a frame, and the unnecessary area other than the area to be enlarged is shown by hatching.

In the case of the electronic zoom of 2×, to scan only the area of the image-pickup-element light receiving surface 51 which is to be enlarged, the transfer speed of the vertical transfer pulse of FIG. 2(a) for driving the vertical CCD register (not shown) provided in the image pickup element 104 is made fast during only a vertical blanking period, thereby sweeping out the unnecessary charge accumulated in the upper and lower hatched areas of the image-pickup-element light receiving surface 51. Regarding the area to be enlarged, one vertical transfer pulse of FIG. 2(a) is generated for every other horizontal transfer pulse of FIG. 2(c), thereby reading out the image-pickup-element output signal of FIG. 2(d). At this time, in order that signals accumulated in the horizontal scanning direction can be read out vertically intermittently according to an enlargement magnification, the image-pickup-element output signal of FIG. 2(d) is read out while being thinned out at the ratio of one to two scanning lines in accordance with a control signal supplied from the scanning timing pulse generator 105. Thus, the image-pickup-element output image 52 is prepared.

The read-out image-pickup-element output signal is inputted to the correlated double sampling circuit 106, in which noise components are eliminated. The output of the correlated double sampling circuit 106 is amplitude-limited by the AGC circuit 107 and then supplied to the A/D converter 108, in which the analog signal outputted from the AGC circuit 107 is converted into a digital signal. The digital signal outputted from the A/D converter 108 is supplied to the signal processing circuit 109, in which the digital signal is subjected to chrominance signal processing. The signal outputted from the signal processing circuit 109 is supplied to and stored in the image memory circuit 110. The system control circuit 117 calculates the average values of adjacent scanning lines of the signal stored in the image memory circuit 110, and performs vertical interpolations by interpolating the respective average values between the adjacent scanning lines.

Image signals corresponding to the right and left unnecessary areas 52a of the image-pickup-element output image 52 are discarded in the image memory circuit 110 by inhibiting reading or writing of digital data indicative of the image signals, and the system control circuit 117 performs horizontal interpolations by finding the average values of digital data indicative of adjacent pixels of an image signal which corresponds to an effective area to be enlarged and interpolating the average values between the digital data indicative of the adjacent pixels. The digital signal interpolated in this manner is inputted to the D/A converter 111, in which the interpolated digital signal is converted into an analog image signal. Thus, the image shown as the monitor image 53 is obtained.

Exposure control to be executed during electronic zooming, which constitutes one feature of the third embodiment, will be described below.

As is apparent from the above description, the exposure control according to the third embodiment is arranged to control the iris 102, the AGC circuit 107, the accumulation time of the image pickup element 104, and the like so that a video signal level can be kept constant. However, if the area of the image plane which is to be subjected to exposure control is made coincident with an angle of view which is electronically varied in the above-described manner and exposure control is executed by using a signal subjected to enlargement processing and interpolation processing, the following problem occurs.

If a final angle of view provided by electronic zooming differs from an area to be subjected to light measurement, the amount of exposure of an electronically zoomed image may not reach an optimum exposure level. If an image signal indicative of an electronically zoomed image, i.e., the output of the D/A converter 111, is supplied to the integrating circuit 113 and the gate circuit 115 on an "as is outputted" basis in order to make the final angle of view provided by the electronic zooming coincident with the angle of view to be subjected to light measurement, a signal near a high-luminance portion of an image signal which has been subjected to enlargement and interpolation processing during an electronic-zooming operation in the above-described manner is compressed and clipped because of the insufficient dynamic range of an A/D converter, a D/A converter, a signal processing circuit or the like or by the influence of gamma correction, knee correction or white peak clipping in the signal processing circuit. This makes it impossible to faithfully obtain information, so that it becomes impossible to correctly control the exposure level of a high-luminance subject or a high-contrast subject during photography.

To solve the above-described problem, according to the third embodiment, the output signal of the image pickup element which is not yet subjected to the aforesaid signal processing, such as gamma correction, is employed for exposure control so that even if a non-interpolated, no-signal-containing line occurs in an image which is intermittently read out during an electronic image magnification enlarging operation, it is possible to correct the influence of such a no-signal-containing line upon the exposure control. In addition, since a signal which is not yet subjected to the signal processing, such as gamma correction, and has a sufficient dynamic range is employed as a signal in which to detect an image for exposure control, it is possible to achieve correct exposure control even in the case of a high-luminance subject, whereby it is possible to achieve optimum exposure control similar to that achievable in a normal photographic operation.

Specifically, referring to FIG. 6, the output signal of the AGC circuit 107 is employed. This AGC output signal is supplied to the light measuring circuit 112, the integrating circuit 113 and the comparing circuit 114 as well as to the gate circuit 115 and the integrating circuit 116. The output signals of the comparing circuit 114 and the integrating circuit 116 are supplied to the system control circuit 117. The system control circuit 117 is arranged to execute normal exposure control processing if no electronic image magnification enlarging operation is performed. However, since the output signal of the AGC circuit 107 is a signal which is not yet subjected to the signal processing, such as gamma correction or knee correction, and has a sufficient dynamic range, it is possible to provide accurate luminance information even in the case of a high-luminance subject. Accordingly, although the system control circuit 117 executes exposure control similar to the conventional one, it is possible to achieve correct exposure control even in the case of a high-luminance subject or a high-contrast subject.

Although it is possible to achieve correct exposure control by employing a signal, which is horizontally thinned out and is not subjected to interpolation, as a video signal for exposure control in the above-described manner, it is still difficult to realize accurate exposure control with such a method alone.

For this reason, the system control circuit 117 is arranged to execute the following processing operation during the electronic image magnification enlarging operation.

Since the output signal of the AGC circuit 107 during the electronic image magnification enlarging operation is horizontally thinned out and is not subjected to interpolation, no-signal-containing lines are present in the output signal. For example, if a 2× enlargement operation is executed as described above, reading from the image pickup element 104 is performed at the ratio of one to two scanning lines, and half of the read-out lines contain no signals. The attenuation ratio of the signal outputted from the comparing circuit 114 in this case is ½ times that of a signal outputted from the comparing circuit 114 when a subject of equal brightness is photographed without executing the electronic image magnification enlarging operation.

Similarly, if the image magnification of the electronic image magnification enlarging operation is n times, the attenuation ratio is 1/n times, which means that the attenuation ratio varies with the image magnification. Accordingly, the intermittent data correcting part 117g provided in the system control circuit 117 corrects the amount of attenuation of a detected signal due to no-signal-containing lines, according to the image magnification on the basis of image magnification information supplied from the electronic-zoom magnification control part 117b. On the basis of the data corrected by the intermittent data correcting part 117g, the exposure control data computing part 117a computes the amount of correction so that the output of the D/A converter 111 can always be kept constant at a correct level.

Similarly, the output signal of the integrating circuit 116 in which the image plane is divided into equal parts also varies according to the image magnification of the electronic image magnification enlarging operation. Accordingly, the amount of attenuation due to the no-signal-containing lines is corrected by the intermittent data correcting part 117h. The output of the intermittent data correcting part 117h is employed as a program AE control signal in the exposure control data computing part 117a, whereby an effective exposure control operation is performed.

As described previously, it is possible to compensate for the influence of horizontal intermittent signals upon exposure control during the electronic image magnification enlarging operation, by means of correcting means, i.e., the intermittent data correcting parts 117g and 117h of the system control circuit 117. However, since the output signal of the AGC circuit 107 is not subjected to vertical interpolation either, the ratio of a gate pulse corresponding to a weighted central portion in the light measuring circuit 112 varies with the image magnification used during the electronic image magnification enlarging operation, and this variation influences the exposure control operation.

One example of this phenomenon will be described with reference to FIGS. 7(a) to 7(c), 8(a) to 8(c) and 9(a) to 9(c).

FIGS. 7(a) to 7(c) show the state of a center-weighted gate pulse which is obtained when no electronic image magnification enlarging operation is performed. FIG. 7(a) shows the state of a light receiving surface 71 of the image pickup element 104, and FIG. 7(b) shows an output image 72 of the image pickup element 104. Since no electronic-zooming operation is performed, the read-out area of the image pickup element 104 shown in FIG. 7(b) is equal to the image-pickup-element light receiving surface 71 of the image pickup element 104 shown in FIG. 7(a). In each of FIGS. 7(b) and 7(c), the central hatched portion indicates a light measuring area.

FIGS. 8(a) to 8(c) show a case in which an electronic image magnification enlarging operation is performed at an image magnification of 2×. FIG. 8(a) shows the state of a light receiving surface 81 of the image pickup element 104. In FIG. 8(a), the central white portion indicates a read-out area from which to read out a picked-up image signal for enlarging purpose, while the surrounding area indicates an unnecessary image area. FIG. 8(b) shows an output image 82 of the image pickup element 104, and the output image 82 is formed by horizontal lines which are vertically thinned out. In FIG. 8(b), the central hatched area indicates a light measuring area. FIG. 8(c) shows a monitor image 83 which is finally displayed on a monitor (not shown), and the monitor image 83 is formed by information which is also horizontally thinned out. In FIG. 8(c), the central hatched area indicates a light measuring area.

Figure 9C:
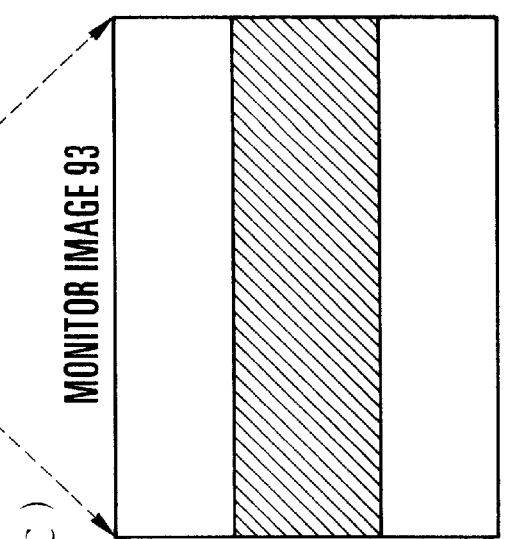
FIGS. 9(a) to 9(c) are conceptual diagrams showing the state of a center-weighed gate pulse which is obtained when an electronic image magnification enlarging operation is performed at an image magnification of 4×.
Figure 9B:
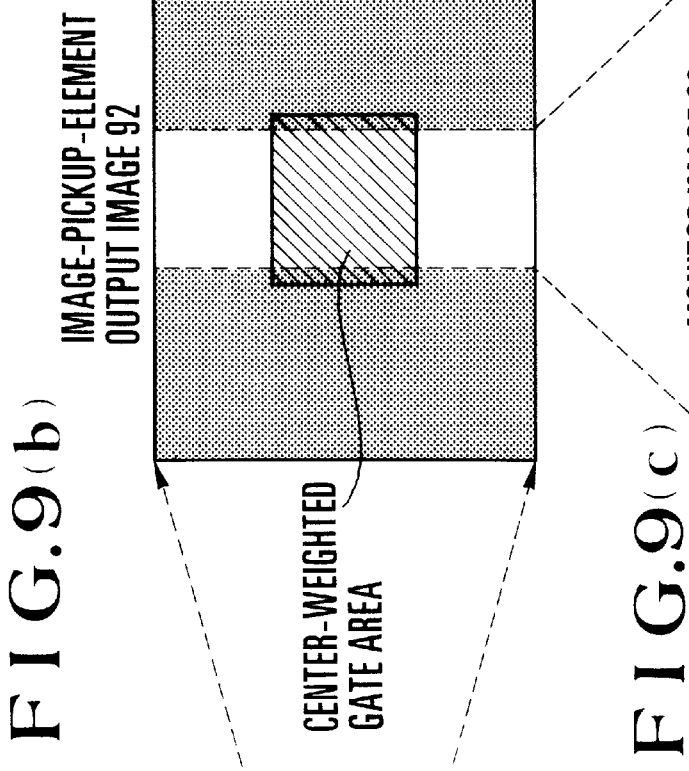
Figure 9A:
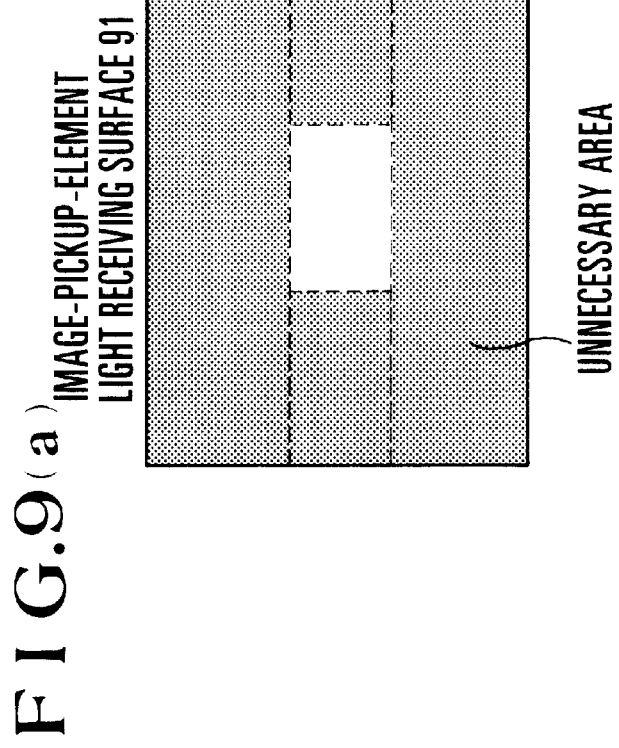

FIGS. 9(a) to 9(c) show a case in which an electronic image magnification enlarging operation is performed at an image magnification of 4×. FIG. 9(a) shows the state of a light receiving surface 91 of the image pickup element 104. In FIG. 9(a), the central white portion indicates a read-out area from which to read out a picked-up image signal for enlarging purpose, while the surrounding area indicates an unnecessary image area. FIG. 9(b) shows an output image 92 of the image pickup element 104, and the output image 92 is formed by horizontal lines which are vertically thinned out. In the stage shown in FIG. 9(b), the central light measuring area (central hatched area) includes an unnecessary area outside of the read-out area. FIG. 9(c) shows a monitor image 93 which is finally displayed on the monitor (not shown), and the monitor image 83 is formed by information which is also horizontally thinned out. In FIG. 9(c), the central hatched area indicates a light measuring area.

As shown in FIGS. 8(a) through 9(c), although the gated areas in the output signal of the AGC circuit 107 are of the same size as shown by the image-pickup-element output images 72, 82 and 92, the respective areas gated by the center-weighted gate pulses differ in size in the interpolated, output signal of the D/A converter 111. Specifically, the gated areas of the monitor image 83 and the monitor image 93 extend horizontally in opposite directions compared to the monitor image 73 which is not subjected to an enlarging operation, so that the ratio of the weighted central portion varies according to the image magnification. This indicates that the state of exposure control varies by the influence of the image magnification of the electronic zooming. To compensate for such an influence, the system control circuit 117 causes the gate pulse generating part 117f to vary the size of the center-weighted gate pulse according to the image magnification, thereby providing control so that the ratio of the gated area is prevented from varying in the output of the D/A converter 111. Thus, the image magnification is prevented from influencing the exposure control operation.

Similarly, the size and the gate position of gate pulses for dividing the image plane vary in the output signal of the D/A converter 111 according to the image magnification. Since the output signal of the AGC circuit 107 contains signals indicated at the unnecessary areas 52a of the image-pickup-element output image 52, the gate pulse generating part 117f generates gate pulses corresponding to the unnecessary areas 52a as shown in an image-plane division state 101A of FIG. 10(a) (an example in which the image plane is divided into sixty-four parts), so that the unnecessary areas 52a which are not displayed in the monitor image 53 outputted as a standard video signal are detected. As a result, the system control circuit 117 cannot obtain accurate data and erroneously controls an exposure operation.

Figure 10A:
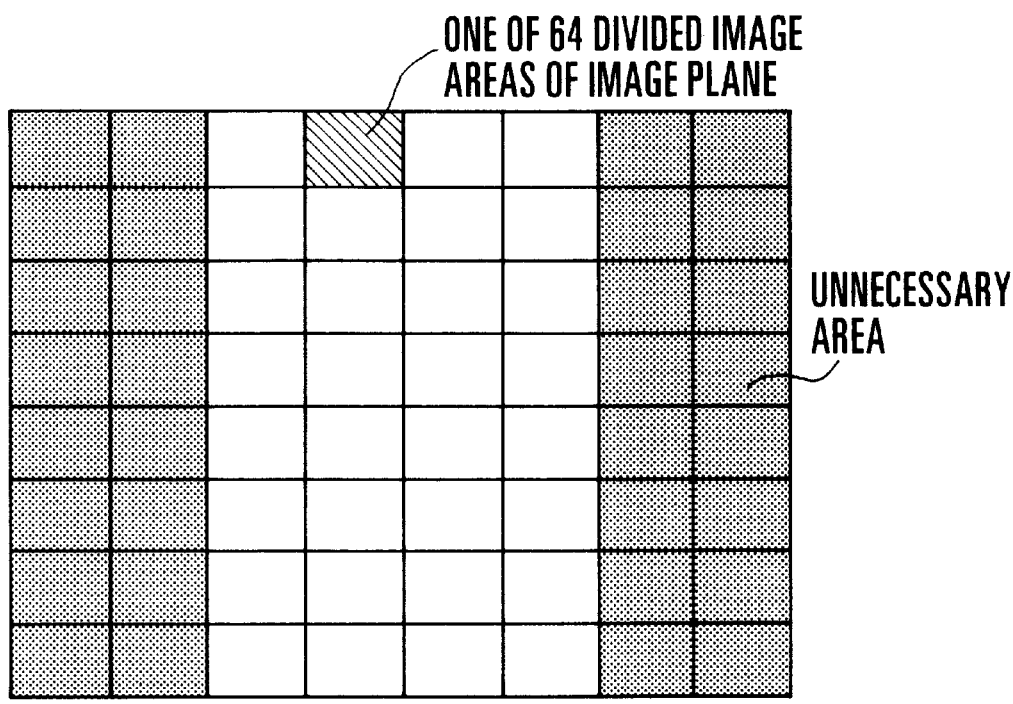
FIGS. 10(a) and 10(b) are conceptual diagrams showing the vertical correction of the divided areas of an image plane during an electronic image magnification enlarging operation.
Figure 10B:
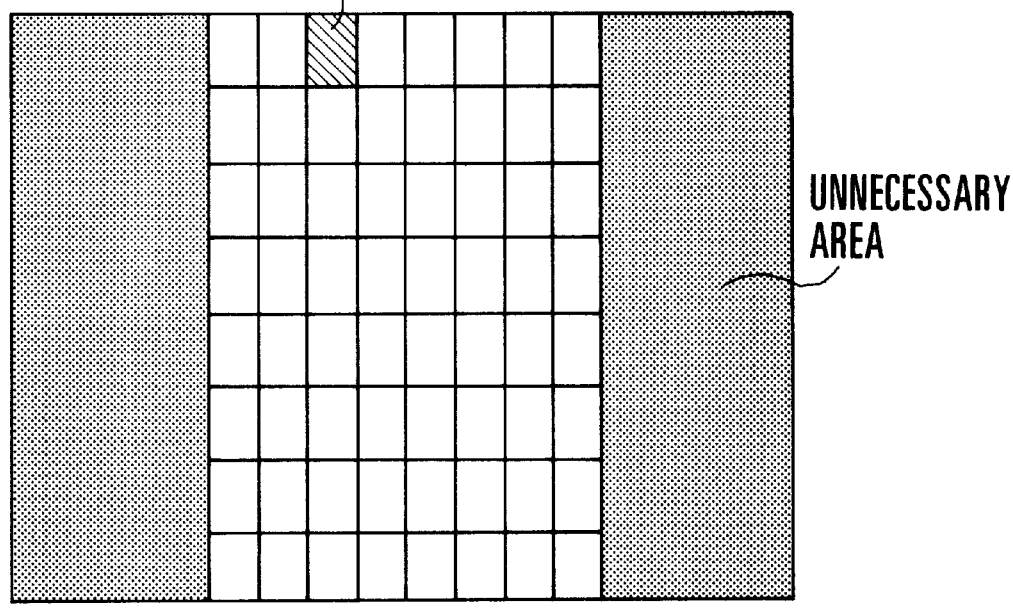

However, in the gate pulse generating part 117f of the system control circuit 117, the size and the gate position of gate pulses are made to vary as shown in an image-plane division signal 102A of FIG. 10(b) in accordance with the effective area of the image-pickup-element output image 52 which varies in size according to the image magnification. Thus, it is possible to provide an accurate image-plane division signal for the output signal of the D/A converter 111 which constitutes a monitor image.

As described previously, if an electronic image magnification enlarging operation is executed at the image magnification of 2×, the signal accumulated in the image pickup element 104 is read out in the state of being thinned out every other scanning line, and no-signal-containing lines and signal-containing lines are uniformly present in the read-out image signal. If the image magnification is lower than 2×, no-signal-containing lines occur at the ratio of, for example, one to some tens of scanning lines, whereas if the image magnification is higher than 2×, the number of signal-containing lines is less than the number of no-signal-containing lines. In the case of such an awkward image magnification, the number of no-signal-containing lines varies among different gate positions, so that even if a subject of uniform brightness is photographed, the data contained in an image-plane division signal differ among individual gate areas.

Figure 11A:
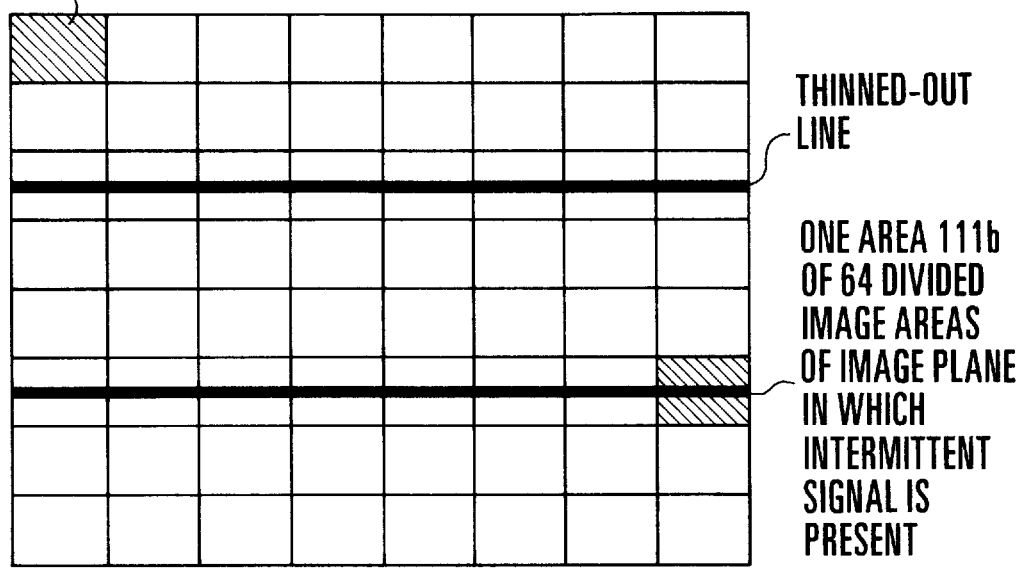
FIGS. 11(a) and 11(b) are conceptual diagrams showing the horizontal correction of the divided areas of an image plane during an electronic image magnification enlarging operation.
Figure 11B:
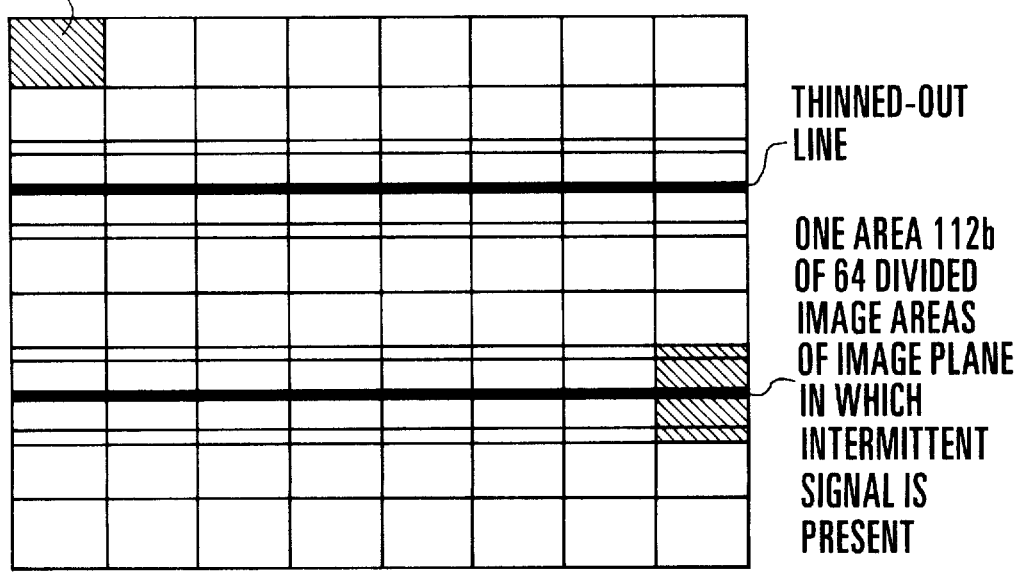

In the case shown in FIG. 11(a) (an example in which an image plane is divided into sixty-forty parts during an electronic image magnification enlarging operation in which scanning lines are thinned out by two lines), if a subject of uniform brightness is photographed, an image-plane division signal obtained from a gate area 111b which contains a no-signal-containing line becomes smaller than the signal obtained from a gate area 111a. To compensate for this influence, in the case of FIG. 11(b), as shown by a gate area 112b, gate pulse signals constituting each line of gate areas which contains a no-signal-containing line are made larger than gate pulse signals which constitute the other lines.

As described above, the gate pulse generating part 117f of the system control circuit 117 corrects the image-plane division state by shifting the size and position of particular gate areas in accordance with the position and number of no-signal-containing lines determined by an image magnification so that signal lines can uniformly exist over all gate areas even if an electronic image magnification enlarging operation is performed. Accordingly, it is possible to achieve a further accurate exposure control operation.

Figure 12:
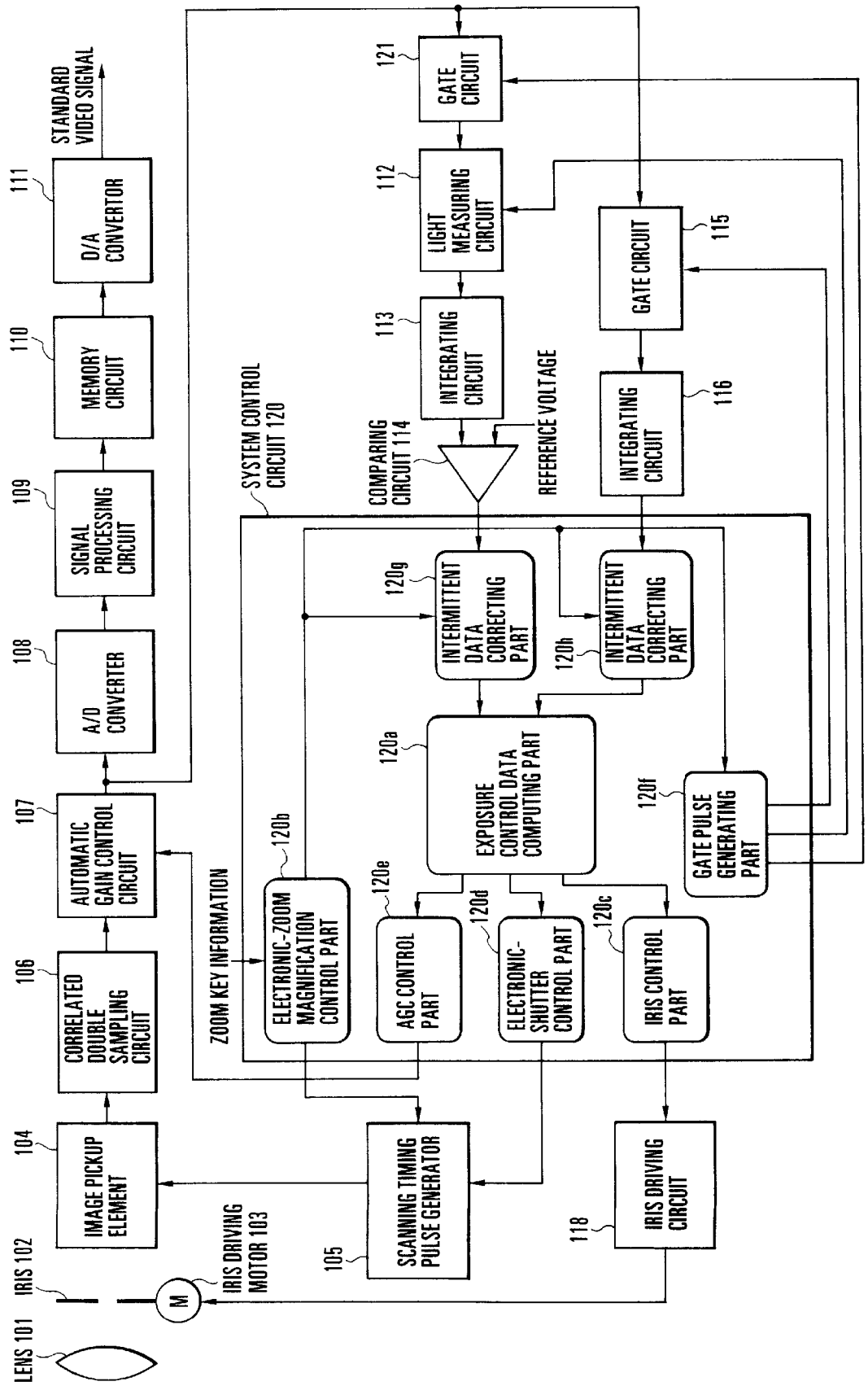
FIG. 12 is a block diagram showing a fourth embodiment of the image pickup apparatus according to the present invention.

A fourth embodiment of the present invention will be described below. FIG. 12 shows one example of an exposure control system for an image pickup apparatus provided with electronic image magnification enlarging means according to the fourth embodiment of the present invention. In the fourth embodiment, a system control circuit 120 which has internal processing different from that of the system control circuit 117 is substituted for the system control circuit 117, and a gate circuit 121 is added. Incidentally, since parts 120a to 120f of the system control circuit 120 correspond to the respective parts 117a to 117f of the system control circuit 117 according to the third embodiment shown in FIG. 6, the descriptions of the respective parts 120a to 120f are omitted.

In the arrangement of the third embodiment in which the output signal of the AGC circuit 107 is directly gated by a center-weighted gate pulse in the light measuring circuit 112, if a complete, center-weighted light measurement is to be performed, the influence of intermittent signals during an electronic image magnification enlarging operation can be corrected by the correcting means described in connection with the third embodiment. However, as described previously in connection with the related art, in the case of light measurement which utilizes the advantages of average light measurement and center-weighted light measurement while weighting detection data for each of the average light measurement and the center-weighted light measurement, the output signal of the AGC circuit 107 during the electronic image magnification enlarging operation contains signals indicated at the unnecessary areas 52a of the image-pickup-element output image 52. As a result, the exposure control is influenced by the brightness of a subject which is not displayed as the monitor image 53 outputted as a standard video signal, so that optimum exposure may not be performed on the monitor image 53. To solve this problem, in accordance with the fourth embodiment, the output signal of the AGC circuit 107 is supplied to the gate circuit 121 and the output signal of the gate circuit 121 is processed by the light measuring circuit 112.

The gate circuit 121 receives from the gate pulse generating part 120f of the system control circuit 120 a gate pulse which serves to eliminate signal portions indicated at the unnecessary areas 52a of the image-pickup-element output image 52 which vary according to the image magnification used during the electronic image magnification enlarging operation. In accordance with the gate pulse, the gate circuit 121 gates the output signal of the AGC circuit 107 and outputs an image signal corresponding to an area to be outputted as a monitor image. The light measuring circuit 112 executes weighting processing on the basis of the output signal of the gate circuit 121, so that it is possible to perform an optimum exposure operation on the monitor image 53. Incidentally, methods for correcting a center-weighted gate pulse and an image-plane dividing gate pulse during an exposure control operation and an electronic image magnification enlarging operation are similar to those described in connection with the third embodiment.

As is apparent from the above description, in accordance with the aforesaid embodiments, in the image pickup apparatus provided with the electronic image magnification enlarging means and the exposure control means, since exposure control is executed on the basis of a signal which is not yet subjected to signal processing, such as gamma correction, and has a sufficient dynamic range capable of providing accurate information indicative of a high-luminance signal portion, it is possible to consistently execute accurate exposure control irrespective of electronic variations in image magnification.

When the electronic image magnification enlarging means is in operation, if a picked-up image signal which is vertically intermittently read out from an image pickup element and is not yet subjected to interpolation is employed as a video detection signal for exposure controls the influence of a no-signal-containing portion upon the exposure control is corrected. Accordingly, even if the electronic image magnification enlarging operation is executed, it is possible to perform a consistently stable, optimum exposure control operation on various subjects similarly to the case where no electronic image magnification enlarging operation is performed.

A fifth embodiment of the present invention will be described below.

The fifth embodiment is intended to achieve correct exposure even if electronic zooming is performed, similarly to the first to fourth embodiments.

Specifically, the fifth embodiment is intended to solve the problem that if exposure is controlled by using a signal which is not yet converted into an enlarged image through interpolation, an image subjected to the interpolation is displayed on a monitor display at an incorrect exposure level, so that no high-quality, enlarged image can be attained. The fifth embodiment is further intended to provide an image pickup apparatus capable of displaying an image subjected to interpolation on a monitor display at an accurate exposure level, thereby making it possible to provide a high-quality, enlarged image.

To achieve such objects, in accordance with the fifth embodiment, there is provided an image pickup apparatus which comprises electronic image magnification enlarging means for generating an enlarged image by interpolating, into a picked-up image signal intermittently read out from an image pickup element at a transfer rate determined by an image magnification of a subject, an interpolation signal generated from the picked-up image signal and electronically enlarging the image magnification of the subject, particular-area selecting means for dividing an image pickup surface of the image pickup element into a plurality of areas and specifying particular areas from among the plurality of divided areas in accordance with the image magnification enlarged by the electronic image magnification enlarging means, average-amount-of-light detecting means for detecting an average amount of light by integrating picked-up image signals corresponding to the respective particular areas specified by the particular-area selecting means, and exposure controlling means for controlling exposure at the time of generation of the enlarged image in accordance with the average amount of light detected by the average-amount-of-light detecting means.

Figure 13:
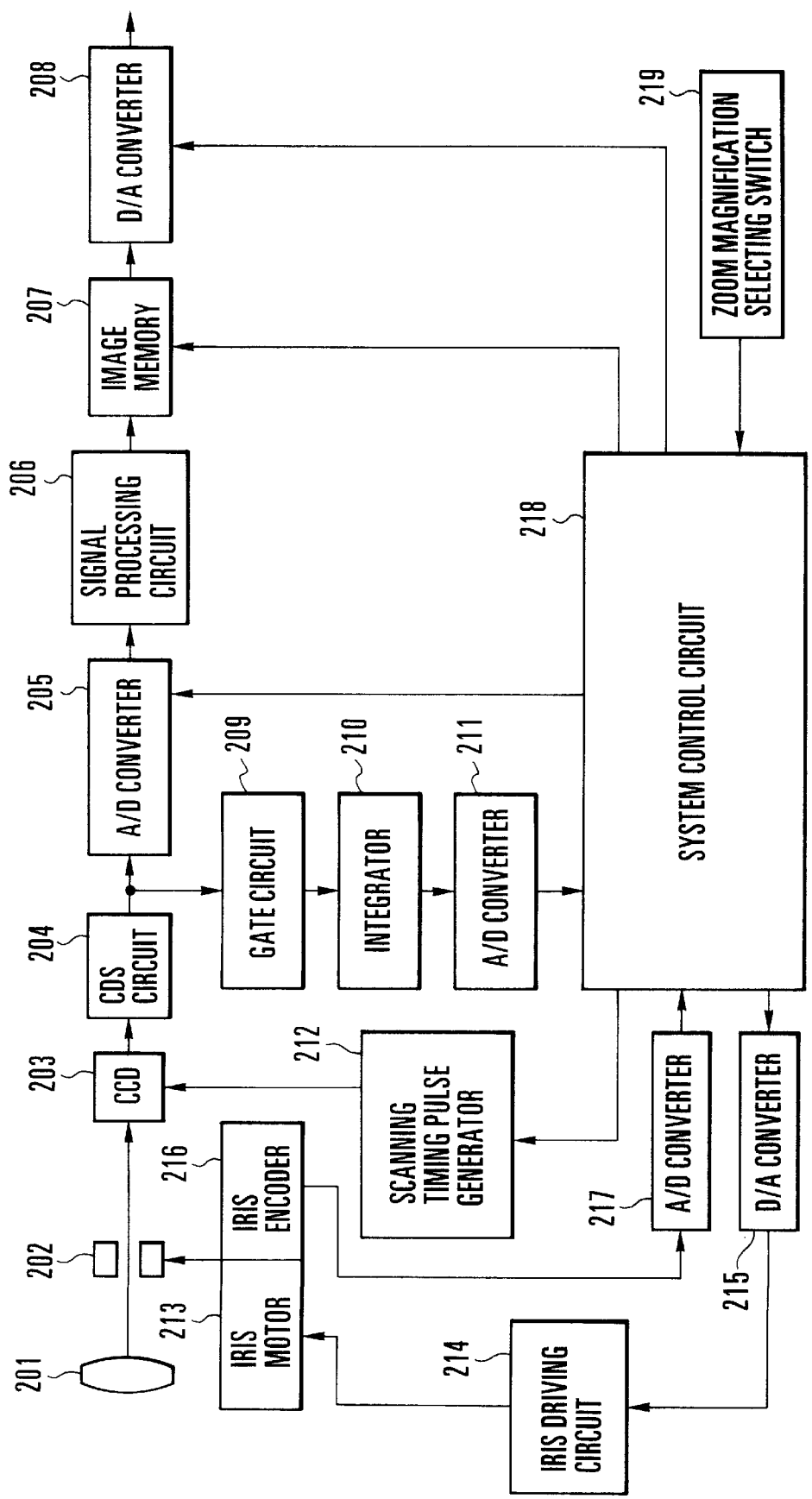
FIG. 13 is a block diagram showing the arrangement of a fifth embodiment of the image pickup apparatus according to the present invention.

In the above-described arrangement, the electronic image magnification enlarging means generates an enlarged image by interpolating, into a picked-up image signal intermittently read out from an image pickup element at a transfer rate determined by an image magnification of a subject, an interpolation signal generated from the picked-up image signal and electronically enlarging the image magnification of the subject. Also, the particular-area selecting means divides an image pickup surface of the image pickup element into a plurality of areas and specifies particular areas from among the plurality of divided areas in accordance with the image magnification enlarged by the electronic image magnification enlarging means, and the average-amount-of-light detecting means detects an average amount of light by integrating picked-up image signals corresponding to the respective particular areas specified by the particular-area selecting means. The exposure controlling means controls exposure at the time of generation of the enlarged image in accordance with the average amount of light detected by the average-amount-of-light detecting means. Accordingly, it is possible to display an image subjected to interpolation on a monitor display at an accurate exposure level, thereby making it possible to provide a high-quality, enlarged image. FIG. 13 is a block diagram showing the arrangement of an image pickup apparatus of this kind. As shown in FIG. 13, an iris 202 for adjusting the amount of light incident on a photographic lens 201 is provided at the rear stage of the photographic lens 201. An image pickup element 203, such as a CCD, is provided at the rear stage of the iris 202. The image pickup element 203 performs photoelectric conversion of an image signal (light signal) indicative of an image of a subject which is focused on the image pickup surface of the image pickup element 203 by the photographic lens 201 and the amount of light of which is adjusted by the iris 202. The picked-up image signal outputted from the image pickup element 203 is inputted to a correlated double sampling circuit (CDS circuit) 204, in which noise due to charge accumulated in the image pickup element 203 is eliminated.

The CDS circuit 204 is connected to a first A/D converter 205, and the A/D converter 205 is connected to a signal processing circuit 206. The picked-up image signal from which the noise has been eliminated by the CDS circuit 204 and which has been A/D-converted by the A/D converter 205 is subjected to chrominance-signal processing by the signal processing circuit 206. The output signal of the signal processing circuit 206 is stored in an image memory 207. The image memory 207 is connected to a first D/A converter 208, and the picked-up image signal read out from the image memory 207 is D/A-converted by the D/A converter 208, and the resultant analog signal is supplied to an external circuit (not shown).

The CDS circuit 204 is also connected to a gate circuit 209. The gate circuit 209 is provided for performing gate processing on the image pickup surface of the image pickup element 203 which is divided into a plurality of parts (or areas) and extracting a picked-up image signal corresponding to a predetermined area from the output signal of the CDS circuit 204. The gate circuit 209 is connected to an integrator 210. The integrator 210 is provided for integrating the picked-up image signal corresponding to the area extracted by the gate circuit 209 and computing the average amount of light incident upon the extracted area. The integrator 210 is connected to a second A/D converter 211, and the A/D converter 211 is connected to a system control circuit 218. The system control circuit 218 is formed by a microcomputer for controlling the operation of the entire image pickup apparatus. The output of the integrator 210 is A/D-converted by the second A/D converter 211, and the resultant analog signal is supplied to the system control circuit 218.

A scanning timing pulse generator 212 for controlling the storage operation, the read-out operation and the reset operation of the image pickup element 203 is connected to the system control circuit 218, and the scanning timing pulse generator 212 is connected to the image pickup element 203. A second D/A converter 215 is connected to the system control circuit 218 via an iris driving circuit 214. The iris driving circuit 214 is connected to an iris motor 213 for driving the iris 202 to open and close it. The first A/D converter 205, the image memory 207 and the first D/A converter 208 are connected to the system control circuit 218. An iris encoder 216 formed by a Hall element for detecting the opening degree of the iris 202 is connected to the system control circuit 218 via a third A/D converter 217. A zoom magnification selecting switch 219 for selecting an image magnification of the electronic zoom is connected to the system control circuit 218.

Figure 14:
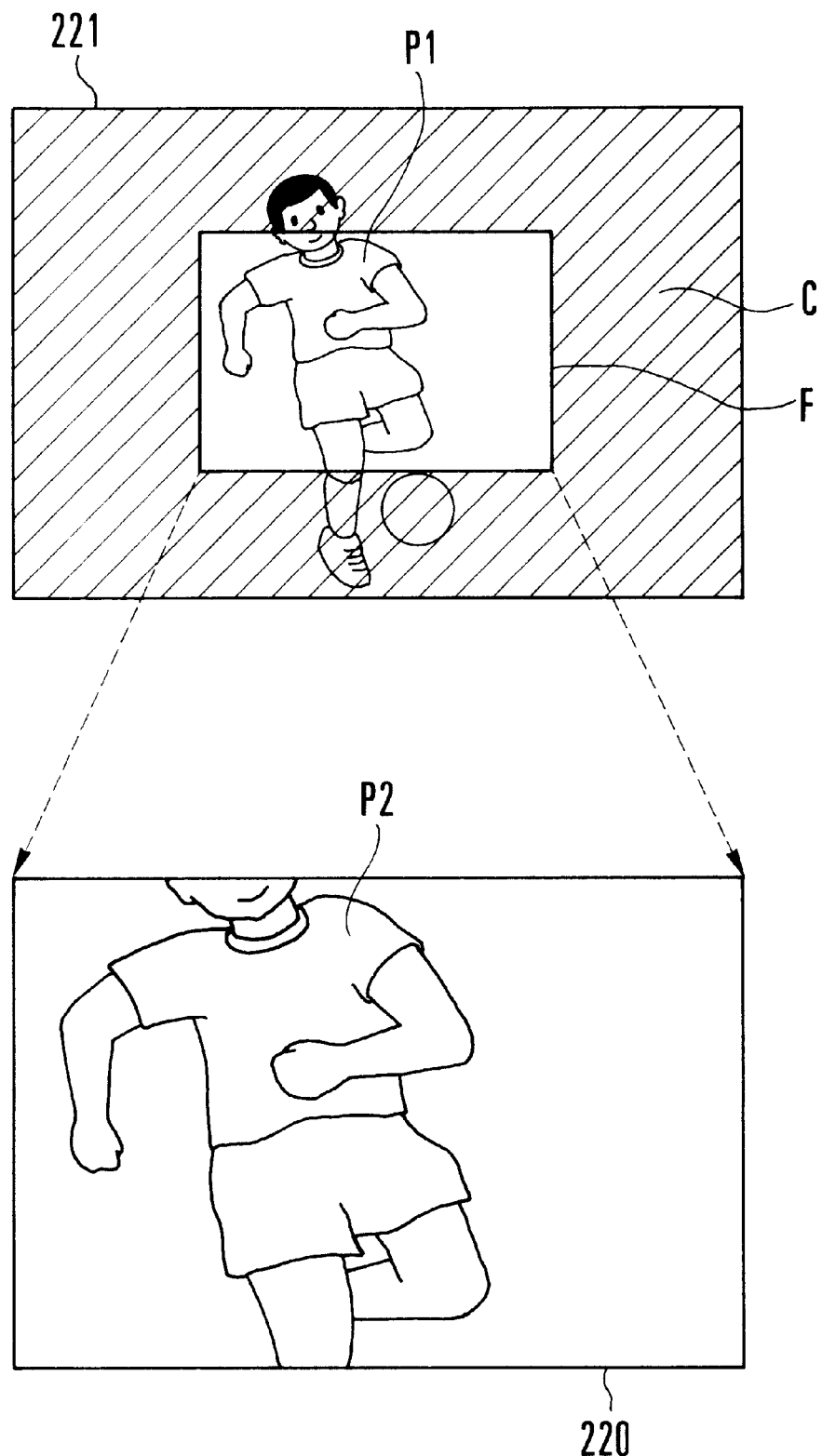
FIG. 14 is an explanatory view showing a subject image formed on an image pickup surface and that displayed on a monitor display in the fifth embodiment of the image pickup apparatus according to the present invention.

The operation of the image pickup apparatus having the above-described arrangement will be described below with reference to FIGS. 2(a) to 2(d) and FIG. 14. FIGS. 2(a) to 2(d) are timing charts showing the scanning timing of the image pickup element 203. FIG. 14 is an explanatory view showing a subject image formed on the image pickup surface of the image pickup element 203 and that displayed on a monitor display.

In accordance with an instruction supplied from the system control circuit 218, the scanning timing pulse generator 212 outputs the vertical transfer pulse shown in FIG. 2(a), the horizontal transfer pulse shown in FIG. 2(b) and the horizontal scanning pulse shown in FIG. 2(c), and the output signal shown in FIG. 2(d) is read out from the image pickup element 203.

Referring to FIG. 14, an area to be enlarged on an image pickup surface (light receiving surface) 221 of the image pickup element 203 (hereinafter referred to as the "enlarging area") is surrounded by a frame F, and the other, unnecessary area (hereinafter referred to as the "non-enlarging area") is marked by inclined lines C. To scan only the enlarging area of the image pickup surface 221, the transfer speed of the vertical transfer pulse (refer to FIG. 2(a)) for driving a vertical CCD register (not shown) provided in the image pickup element 203 is made fast during only a vertical blanking period, thereby sweeping out the unnecessary charge accumulated in the upper and lower portions of the non-enlarging area of the scanning timing pulse generator 212. Regarding the enlarging area, one vertical transfer pulse (refer to FIG. 2(a)) is generated for every other horizontal transfer pulse (refer to FIG. 2(c)), thereby reading out the output signal (refer to FIG. 2(d)) from the image pickup element 203. At this time, in order that signals accumulated in the horizontal scanning direction can be read out vertically intermittently according to an enlargement magnification, the output signal (refer to FIG. 2(*d*)) of the image pickup element 203 is read out while being thinned out at the ratio of one to two scanning lines in accordance with a control signal supplied from the scanning timing pulse generator 212.

The output signal thus read out from the image pickup element 203 is inputted to the CDS circuit 204, in which noise components are eliminated. The output of the CDS circuit 204 is supplied to the first A/D converter 205, in which the analog picked-up image signal is converted into a digital signal. The digital signal outputted from the A/D converter 205 is supplied to the signal processing circuit 206, in which the digital signal is subjected to signal processing such as chrominance signal processing. The signal outputted from the signal processing circuit 206 is stored in the image memory 207. The system control circuit 218 computes the average values of adjacent scanning lines of the output signal of the image pickup element 203 stored in the image memory 207, and executes vertical interpolations by interpolating the respective average values between the adjacent scanning lines. Picked-up image signals corresponding to the right and left portions of the non-enlarging area of the image pickup surface 221 of the image pickup element 203 are discarded in the image memory circuit 207 by inhibiting reading or writing of digital data indicative of the picked-up image signals, and the system control circuit 218 executes horizontal interpolations by finding the average values of adjacent digital data contained in a picked-up image signal which corresponds to the enlarging area and interpolating the average values between the adjacent digital data by the required number of times. The digital signal interpolated in this manner is inputted to the first D/A converter 208, in which the interpolated digital signal is converted into an analog picked-up image signal. Thus, as shown in FIG. 14, an enlarged image P2 which corresponds to an image P1 contained in the enlarging area of the image pickup surface 221 of the image pickup element 203 is displayed on a monitor display 220.

The exposure control operation of this kind of image pickup apparatus will be described below with reference to FIG. 15. FIG. 15 is an explanatory view of the manner in which the image pickup surface 221 of the image pickup element 203 is divided into a plurality of areas.

Referring back to FIG. 13, a light signal passing through the photographic lens 201 is made incident on the image pickup element 203 via the iris 202. The incident light signal is photoelectrically converted by the image pickup element 203, and the output signal of the image pickup element 203 is inputted to the CDS circuit 204. In this case, to control exposure, the luminance signal outputted from the CDS circuit 204 is gated by the gate circuit 209 in correspondence with the image pickup surface 221 of the image pickup element 203 which is divided into sixty-four areas 1-A to 1-H, 2-A to 2-H, . . . , 8-A to 8-H as shown in FIG. 15, and the thus-gated luminance signals corresponding to the respective areas are read by the gate circuit 209. The luminance signals read by the gate circuit 209 in this manner are integrated for the respective sixty-four areas by the integrator 210. The integral luminance signals are A/D-converted by the A/D converter 211 and inputted into the system control circuit 218. The system control circuit 218 controls the iris driving circuit 214 so that the level of the average amount of light of the luminance signals inputted from the respective sixty-four areas can be accommodated into a predetermined level range which is set in advance.

Thus, the system control circuit 218 controls a control signal to be supplied to the iris motor 213, thereby adjusting the opening degree of the iris 202 to an appropriate value.

Figure 16:
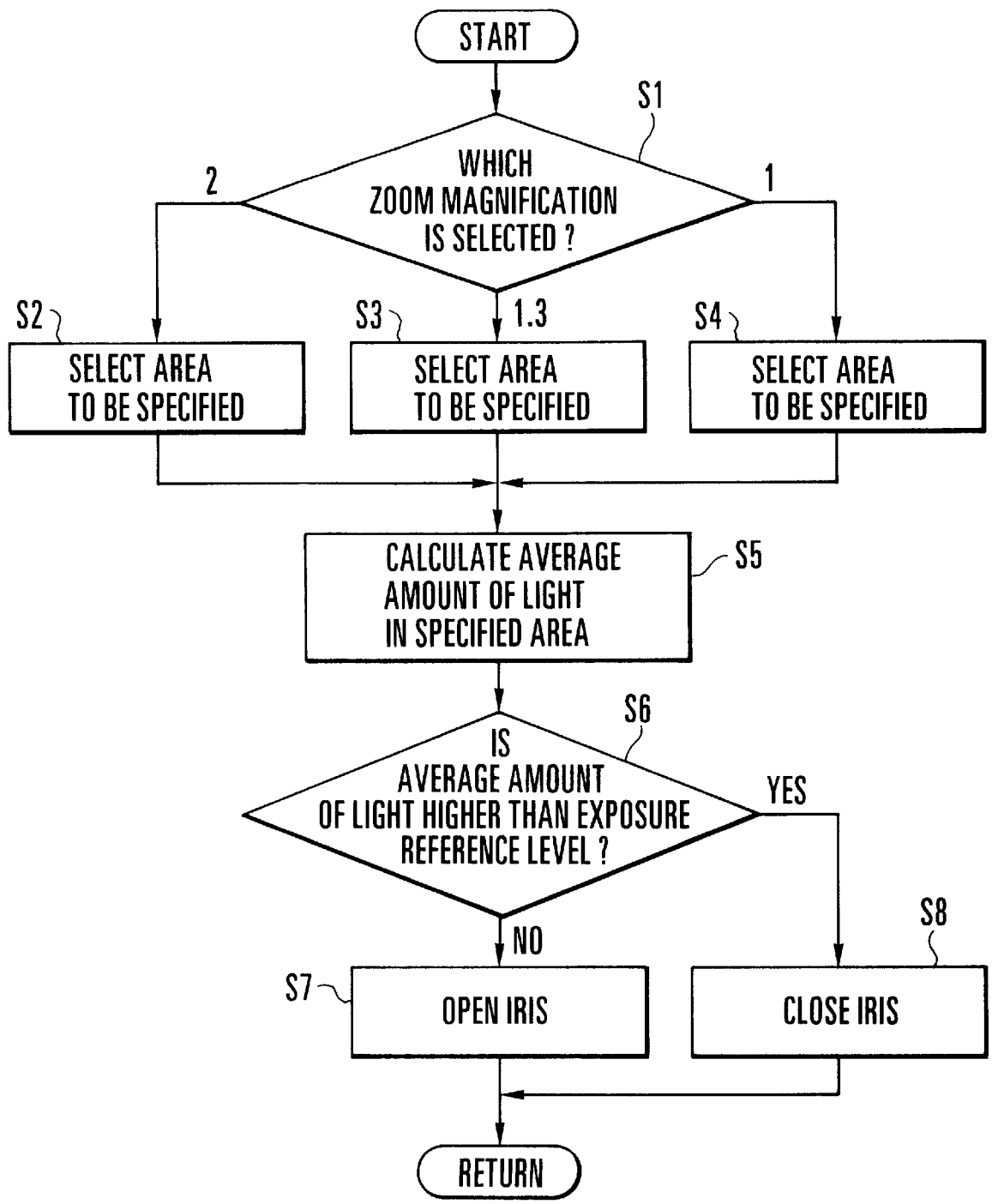
FIG. 16 is a flowchart showing the operation of the fifth embodiment of the image pickup apparatus according to the present invention.

FIG. 16 is a flowchart showing the operation of the image pickup apparatus according to the fifth embodiment. FIGS. 17(*a*) and 17(*b*) are explanatory views showing the manner in which particular areas are selected from the image pickup surface when the zoom magnification of the image pickup apparatus is set to 2×. FIGS. 18(*a*) and 18(*b*) are explanatory views showing the manner in which particular areas are selected from the image pickup surface when the zoom magnification of the image pickup apparatus is set to 1.3×.

Unlike the conventional examples, the image pickup apparatus according to the fifth embodiment is provided with particular-area selecting means for dividing the image pickup surface 221 of the image pickup element 203 into a plurality of areas and specifying particular areas from among the plurality of divided areas in accordance with an image magnification, average-amount-of-light detecting means for detecting an average amount of light by integrating picked-up image signals corresponding to the respective particular areas specified by the particular-area selecting means, and exposure controlling means for controlling exposure at the time of generation of an enlarged image in accordance with the average amount of light detected by the average-amount-of-light detecting means.

The exposure control operation of the image pickup apparatus according to the fifth embodiment will be described below with reference to the flowchart shown in FIG. 16.

In Step S1, a zoom magnification of 1×, 1.3× or 2× is selected by means of the zoom magnification selecting switch 219. If 2× is selected, the process proceeds to Step S2, or if 1.3× is selected, the process proceeds to Step S3, or if 1× is selected, the process proceeds to Step S4. In one of Steps S2, S3 and S4, particular areas to be specified according to the selected zoom magnification are selected from the plurality of divided areas of the image pickup surface 221 of the image pickup element 203 by the system control circuit 218.

If the zoom magnification of 2× is selected and the process proceeds to Step S2, the gate circuit 209 operates in accordance with an instruction given by the system control circuit 218, so that sixteen areas 3-C to 3-F, . . . , 6-C to 6-F are selected from among the sixty-four divided areas 1-A to 1-H, . . . , 8-A to 8-H of the image pickup surface 221, as shown in FIGS. 17(*a*) and 17(*b*). Then, the process proceeds to Step S5, in which the integrator 210 operates in accordance with an instruction supplied from the system control circuit 218, so that the respective amounts of light of the picked-up image signals contained in the sixteen areas 3-C to 3-F, . . . , 6-C to 6-F selected in Step S2 are integrated. After the average of the integrated amounts of light is computed by the system control circuit 218, the process proceeds to Step S6.

If the zoom magnification of 1.3× is selected and the process proceeds to Step S3, thirty-six areas 2-B to 2-G, . . . , 7-B to 7-G are selected from among the sixty-four divided areas 1-A to 1-H, . . . , 8-A to 8-H of the image pickup surface 221, as shown in FIGS. 18(*a*) and 18(*b*). Then, the process proceeds to Step S5, in which the integrator 210 operates in accordance with an instruction supplied from the system control circuit 218, so that the respective amounts of light of the picked-up image signals contained in the sixty-four divided areas 1-A to 1-H, . . . , 8-A to 8-H selected in Step S3 are integrated. After the average of the integrated amounts of light is computed by the system control circuit 218, the process proceeds to Step S6.

In Step S6, it is determined whether the average amount of light computed in Step S5 is higher than a preset exposure reference level. If it is determined that the computed, average amount of light is higher than the preset exposure reference level, the process proceeds to Step S8, in which the iris driving circuit 214 operates in accordance with an instruction supplied from the system control circuit 218, so that the iris motor 213 drives the iris 202 in the direction in which the iris 202 is closed, thereby decreasing the amount of light. If it is determined that the computed, average amount of light is not higher than the preset exposure reference level, the process proceeds to Step S7, in which the iris driving circuit 214 operates in accordance with an instruction supplied from the system control circuit 218, so that the iris motor 213 drives the iris 202 in the direction in which the iris 202 is opened, thereby increasing the amount of light.

Incidentally, since the electronic-zooming operation of the image pickup apparatus according to the fifth embodiment is similar to that of the image pickup apparatus described previously, a description of the electronic-zooming operation is omitted.

In accordance with the fifth embodiment described above, picked-up image signals are taken out from an enlarging area of the image pickup surface 221 of the image pickup element 203 by the gate circuit 209, and the average value of the amounts of light corresponding to the respective picked-up image signals is found by the integrator 210. The average value is compared to the exposure reference level and the opening degree of the iris 202 is adjusted to perform exposure control. Accordingly, it is possible to perform accurate exposure control according to each electronic-zoom magnification, whereby it is possible to obtain a high-quality, enlarged image.

Although the fifth embodiment has been described with reference to the example in which the image pickup surface 221 of the image pickup element 203 is divided into sixty-four areas, the number or divided areas is not limited to only sixty-four and it is possible to select an arbitrary number as the number of areas into which to divide the image pickup surface 221.

As described above, in accordance with the image pickup apparatus according to the fifth embodiment, when the image magnification of a subject is to be electronically enlarged by performing interpolation on a picked-up image signal intermittently read out from an image pickup element, an image pickup surface of the image pickup element is divided into a plurality of areas and particular areas to be specified according to an image magnification are selected from among the plurality of areas, so that exposure is controlled according to an average amount of light obtained by integrating picked-up image signals corresponding to the specified, particular areas. Accordingly, an image subjected to the interpolation can be displayed on a monitor display at an accurate exposure level, whereby it is possible to obtain a high-quality, enlarged image.

What is claimed is:

1. An image pickup apparatus comprising:
   (A) image pickup means for picking up an image of a subject and outputting a picked-up image signal;
   (B) electronic image magnification varying means for varying an image magnification of the subject by intermittently reading out the picked-up image signal outputted from said image pickup means and varying an image read-out area of an image plane;
   (C) exposure control means for executing exposure control on the basis of a result obtained by comparing a level of the picked-up image signal with a predetermined reference level; and
   (D) correcting means for correcting, in response to the image magnifying operation of said electronic image magnification varying means, the level of the picked-up image signal on the basis of a change of an angle of view by an operation of said electronic image magnification varying means.

2. An image pickup apparatus according to claim 1, further comprising interpolating means for performing interpolation by generating an interpolation signal from the picked-up image signal intermittently read out from said image pickup means and interpolating the interpolation signal into the picked-up image signal, and wherein said exposure control means includes comparing means for comparing a signal based on the picked-up image signal which is intermittently read out from said image pickup means and is not subjected to the interpolation with the picked-up image signal subjected to the interpolation by said interpolating means, said correcting means being arranged to correct an exposure control operation on the basis of an output of said comparing means.

3. An image pickup apparatus according to claim 1, wherein said exposure control means includes an iris for controlling an amount of light incident on said image pickup means and an automatic gain control circuit for controlling an output level of said image pickup means, and controls at least one of said iris and said automatic gain control circuit.

4. An image pickup apparatus comprising:
   (A) image pickup means for outputting an image signal;
   (B) electronic image magnification varying means for electronically varying a magnification of the image signal outputted from said image pickup means;
   (C) exposure control means for performing exposure control on the basis of a result obtained by comparing a level of the image signal corresponding to a predetermined area of an image plane with a predetermined reference level; and
   (D) correcting means for correcting a change of an exposure control state of said exposure control means caused by a change of the level of the image signal depend on a change of the magnification set by said electronic image magnification varying means.

5. An image signal pickup apparatus according to claim 4, further comprising interpolating means for performing interpolation by generating an interpolation signal from the image signal intermittently read out from said image pickup means and interpolating the interpolation signal into the image signal, and wherein said exposure control means includes comparing means for comparing a signal based on the image signal which is intermittently read out from said image pickup means and is not subjected to the interpolation with the image signal subjected to the interpolation by said interpolating means, said correcting means being arranged to correct the exposure control operation on the basis of an output of said comparing means.

6. An image pickup apparatus according to claim 4, wherein said exposure control means includes an iris for controlling an amount of light incident on said image pickup means and an automatic gain control circuit for controlling an output level of said image pickup means, and controls at least one of said iris and said automatic gain control circuit.

7. An image input apparatus comprising:
   (A) electronic angle-of-view varying means for electronically varying an angle of view of an input image;

(B) exposure control means for performing exposure control on the basis of a result obtained by comparing a level of an image signal corresponding to predetermined area of an image plane with a predetermined reference level; and (C) correcting means for correcting a change of an exposure control state of said exposure control means caused by a change of the angle of view set by said electronic angle-of-view varying means.

8. An image input apparatus according to claim 7, further comprising interpolating means for performing interpolation by generating an interpolation signal from a image signal intermittently read out from image pickup means and interpolating the interpolation signal into the image signal, and wherein said exposure control means includes comparing means for comparing a signal based on the image signal which is intermittently read out from said image pickup means and is not subjected to the interpolation with the image signal subjected to the interpolation by said interpolating means, said correcting means being arranged to correct the exposure control operation on the basis of an output of said comparing means.

9. An image input apparatus according to claim 7, wherein said electronic angle-of-view varying means enlarges the input image by intermittently reading out the image signal from an image pickup means, and said correcting means corrects a lowering of an average value of the image signal which is due to a no-signal-containing portion produced by intermittently reading out the image signal.

10. An image input apparatus according to claim 9, wherein said exposure control means controls an iris, an accumulation time of said image pickup means and a gain of an automatic gain control circuit.

11. An image pickup apparatus comprising:

(A) image pickup means for picking up an image of a subject and outputting a picked-up image signal;

(B) electronic image magnification enlarging means for electronically processing the picked-up image signal outputted from said image pickup means and varying the image magnification of the subject;

(C) exposure control means for performing exposure control on the basis of a level of the picked-up image signal which is outputted from said image pickup means and is not processed by said electronic image magnification enlarging means; and (D) correcting means for correcting an output of said exposure control means according to the magnifying operation of said electronic image magnification enlarging means.

12. An image pickup apparatus according to claim 11, further comprising interpolating means for performing interpolation by generating an interpolation signal from the picked-up image signal intermittently read out from said image pickup means and interpolating the interpolation signal into the picked-up image signal, and wherein said exposure control means includes comparing means for comparing a signal based on the picked-up image signal which is intermittently read out from said image pickup means and is not subjected to the interpolation with the picked-up image signal subjected to the interpolation by said interpolating means, said correcting means being arranged to correct an exposure control operation on the basis of an output of said comparing means.

13. An image pickup apparatus comprising:

(A) electronic image magnification enlarging means for electronically enlarging an image magnification of a subject by intermittently reading out a picked-up image signal from an image pickup element at a transfer rate determined by the image magnification of the subject, generating an interpolation signal from the read-out picked-up image signal and interpolating the interpolation signal into the picked-up image signal;

(B) gate means for gating through image-plane dividing means the picked-up image signal which is intermittently read out from the image pickup element and is not subjected to interpolation, when said electronic image magnification enlarging means is in operation;

(C) exposure control means for performing exposure controls respectively corresponding to a plurality of light measuring modes, on the basis of detailed data about an image plane obtained through said gate means; and (D) correcting means for correcting, according to the image magnification, an influence exerted upon the exposure controls by a no-signal-containing portion of the picked-up image signal which varies according to the image magnification of said electronic image magnification enlarging means.

14. An image pickup apparatus according to claim 13, wherein said electronic image magnification enlarging means includes interpolating means for performing interpolation by generating the interpolation signal from the picked-up image signal intermittently read out from said image pickup element and interpolating the interpolation signal into the picked-up image signal, and comparing means for comparing a signal based on the picked-up image signal which is intermittently read out from said image pickup element and is not subjected to the interpolation with the picked-up image signal subjected to the interpolation by said interpolating means, said correcting means being arranged to correct an exposure control operation on the basis of an output of said comparing means.

15. An image pickup apparatus comprising:

(A) image pickup means for picking up an image of a subject and outputting a picked-up image signal;

(B) electronic image magnification enlarging means for enlarging an image magnification of the subject by intermittently reading out the picked-up image signal outputted from said image pickup means and varying an image read-out area of an image plane;

(C) exposure control means for executing exposure control on the basis of a result obtained by comparing a level of the picked-up image signal with a predetermined reference level; and (D) correcting means for correcting, in response to the image magnifying operation of said electronic image magnification enlarging means, an exposure control state caused by a change of the level of the picked-up image signal depend on a change of an angle of view by an operation of said electronic image magnification enlarging means and contained in the picked-up image signal to be supplied to said exposure control means.

16. An image pickup apparatus according to claim 15, wherein said electronic image magnification enlarging means is arranged to vary an angle-of-view by intermittently reading out the picked-up image signal from said image pickup means in accordance with the image magnification of said electronic image magnification enlarging means and said apparatus further comprising interpolating means for interpolating on a no-signal-containing portion produced by intermittently reading out the picked-up image signal, and said exposure control means is arranged to perform exposure control on the basis of a signal which is not subjected to the interpolation by said interpolating means.

17. An image pickup apparatus comprising:
   (A) image storing means for storing an image signal;
   (B) electronic image magnification enlarging means for enlarging an image magnification by intermittently reading out the image signal from said image storing means in accordance with a transfer rate corresponding to the image magnification, generating an interpolation signal from the read-out image signal and interpolating the interpolation signal into the image signal;
   (C) exposure control means for performing, when said electronic image magnification enlarging means is in operation, exposure control on the basis of the image signal which is intermittently read out from said image storing means and is not subjected to interpolation; and
   (D) correcting means for correcting an influence exerted upon said exposure control means by a no-signal-containing portion of the image signal which varies according to the image magnification of said electronic image magnification enlarging means.

18. An image pickup apparatus according to claim 17, wherein said correcting means performs correction according to the image magnification.

19. An image pickup apparatus comprising:
   (A) read-out means for intermittently reading out a picked-up image signal from an image pickup element at a transfer rate determined by an image magnification of a subject;
   (B) electronic image magnification enlarging means for electronically enlarging the image magnification of the subject by generating an interpolation signal from the picked-up image signal intermittently read out by said read-out means and interpolating the interpolation signal into a picked-up image signal;
   (C) exposure control means for performing, when said electronic image magnification enlarging means is in operation, exposure control on the basis of the picked-up image signal which is intermittently read out from the image pickup element and is not subjected to interpolation; and
   (D) correcting means for correcting, in the case that said electronic image magnification enlarging means is in operation, an influence exerted upon said exposure control means by a no-signal-containing portion of the picked-up image signal which is not performed to the interpolation.

20. An image pickup apparatus according to claim 19, wherein said correcting means is arranged to correct, according to the image magnification, the influence exerted upon said exposure control means by the no-signal-containing portion of the picked-up image signal which is not subjected to the interpolation, in the case that said electronic image magnification enlarging means is in operation.

21. An image pickup apparatus comprising:
   (A) read-out means for intermittently reading out a picked-up image signal from an image pickup element at a transfer rate determined by an image magnification of a subject;
   (B) electronic image magnification enlarging means for electronically enlarging the image magnification of the subject by generating an interpolation signal from the picked-up image signal intermittently read out by said read-out means and interpolating the interpolation signal into the picked-up image signal;
   (C) exposure control means for performing, when said electronic image magnification enlarging means is in operation, exposure control on the basis of the picked-up image signal which is intermittently read out from the image pickup element and is not subjected to interpolation;
   (D) pulse generating means for generating a light measuring gate pulse signal for varying a setting of a light measuring area of an image plane in accordance with a respective one of a plurality of light measuring modes;
   (E) gate means for gating, when said electronic image magnification enlarging means is in operation, the picked-up image signal which is intermittently read out from the image pickup element and is not subjected to interpolation, in accordance with the light measuring gate pulse signal generated by said pulse generating means; and
   (F) gate pulse correcting means for correcting, according to the image magnification, the light measuring gate pulse signal outputted from said pulse generating means so that when said electronic image magnification enlarging means is in operation, a light measuring operation similar to that performed when said electronic image magnification enlarging means is inoperative can be performed.

22. An image pickup apparatus according to claim 21, wherein the plurality of light measuring modes include an average light measuring mode for optimizing an average level of the entire image plane and a center-weighted light measuring mode for optimizing exposure in a central portion of the image plane.

23. An image pickup apparatus comprising:
   (A) read-out means for intermittently reading out a picked-up image signal from an image pickup element at a transfer rate determined by an image magnification of a subject;
   (B) electronic image magnification enlarging means for electronically enlarging the image magnification of the subject by generating an interpolation signal from the picked-up image signal intermittently read out by said read-out means and interpolating the interpolation signal into the picked-up image signal;
   (C) exposure control means for performing, when said electronic image magnification enlarging means is in operation, exposure control on the basis of the picked-up image signal which is intermittently read out from the image pickup element and is not subjected to interpolation;
   (D) pulse generating means for generating an image-plane dividing gate pulse signal for detection of picked-up image signals respectively corresponding to a plurality of areas set in an image plane;
   (E) gate means for gating, when said electronic image magnification enlarging means is in operation, the picked-up image signal which is intermittently read out from the image pickup element and is not subjected to interpolation, in accordance with the image-plane dividing gate pulse signal generated by said pulse generating means; and
   (F) correcting means for correcting, when said electronic image magnification enlarging means is in operation, the image-plane dividing gate pulse signal outputted from said pulse generating means, in accordance with the image magnification of said electronic image magnification enlarging means.

24. An image pickup apparatus comprising:
- (A) read-out means for intermittently reading out a picked-up image signal from an image pickup element at a transfer rate determined by an image magnification of a subject;
- (B) electronic image magnification enlarging means for electronically enlarging the image magnification of the subject by generating an interpolation signal from the picked-up image signal intermittently read out by said read-out means and interpolating the interpolation signal into the picked-up image signal;
- (C) pulse generating means for generating, when said electronic image magnification enlarging means is in operation, a gate pulse signal corresponding to an effective video area portion after a horizontal interpolation operation is performed on the picked-up image signal which is intermittently read out from the image pickup element and is not subjected to interpolation;
- (D) gate means for, when said electronic image magnification enlarging means performs an enlarging operation, in accordance with the gate pulse signal generated by said pulse generating means, eliminating an unnecessary area portion and detecting only the effective video area portion after the horizontal interpolation operation is performed on the picked-up image signal which is intermittently read out from the image pickup element and is not subjected to the interpolation; and
- (E) exposure control means for performing exposure control by using an output signal of said gate means to detect a level of the picked-up image signal.

25. An exposure control apparatus comprising:
- (A) an image pickup element;
- (B) electronic image magnification varying means for electronically varying an image magnification by generating an interpolation signal from a picked-up image signal intermittently read out from said image pickup element at a transfer rate determined by the image magnification and interpolating the interpolation signal into the picked-up image signal;
- (C) particular-area selecting means for dividing an image pickup surface of the image pickup element into a plurality of areas and specifying particular areas from among the plurality of areas in accordance with the image magnification enlarged by said electronic image magnification varying means;
- (D) average-amount-of-light detecting means for detecting an average amount of light by integrating picked-up image signals respectively corresponding to the particular areas specified by said particular-area selecting means; and
- (E) exposure controlling means for controlling exposure at the time of generation of an enlarged image in accordance with the average amount of light detected by said average-amount-of-light detecting means.

* * * * *